(12) United States Patent
Mizuno

(10) Patent No.: US 12,456,581 B2
(45) Date of Patent: Oct. 28, 2025

(54) MULTILAYER CERAMIC ELECTRONIC COMPONENT

(71) Applicant: Murata Manufacturing Co., Ltd., Nagaokakyo (JP)

(72) Inventor: Taku Mizuno, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 265 days.

(21) Appl. No.: 18/105,903

(22) Filed: Feb. 6, 2023

(65) Prior Publication Data
US 2023/0260700 A1  Aug. 17, 2023

(30) Foreign Application Priority Data
Feb. 15, 2022 (JP) ................... 2022-021443

(51) Int. Cl.
*H01G 4/012* (2006.01)
*H01G 4/232* (2006.01)
*H01G 4/30* (2006.01)

(52) U.S. Cl.
CPC .............. *H01G 4/012* (2013.01); *H01G 4/30* (2013.01); *H01G 4/2325* (2013.01)

(58) Field of Classification Search
CPC ....... H01G 4/30; H01G 4/0112; H01G 4/2325
See application file for complete search history.

(56) References Cited

U.S. PATENT DOCUMENTS

| | | | |
|---|---|---|---|
| 2003/0222335 A1* | 12/2003 | Hirano | H05K 3/3442 257/E29.022 |
| 2016/0093444 A1* | 3/2016 | Itamura | H01G 4/248 361/301.4 |
| 2016/0181016 A1* | 6/2016 | Koga | H01G 4/232 252/512 |
| 2016/0233027 A1* | 8/2016 | Iijima | H01G 4/232 |
| 2016/0268047 A1* | 9/2016 | Shin | H01G 4/232 |
| 2017/0309402 A1* | 10/2017 | Yamashita | H01F 27/292 |
| 2019/0164693 A1* | 5/2019 | Ono | H01G 4/30 |
| 2020/0066453 A1* | 2/2020 | Jeong | H01G 4/248 |
| 2021/0065988 A1* | 3/2021 | Kim | H01G 4/012 |
| 2022/0293342 A1* | 9/2022 | Hirao | H01G 4/005 |

FOREIGN PATENT DOCUMENTS

JP  2007-142118 A  6/2007

* cited by examiner

*Primary Examiner* — Timothy J. Dole
(74) *Attorney, Agent, or Firm* — Keating & Bennett, LLP

(57) ABSTRACT

A multilayer ceramic electronic component includes a multilayer body, first and second external electrodes on first and second end surfaces. The multilayer body includes an inner layer portion, and first and second outer layer portions. The first and second end surfaces each include an inner layer and first and second outer layer end surfaces. The inner layer end surface includes a protruding end surface, a first coupling surface connecting the first outer layer end surface and the protruding end surface, and a second coupling surface connecting the second outer layer end surface and the protruding end surface. Angles between the first and second outer layer end surfaces and between the first and second coupling surfaces at a boundary between the first and second outer layer end surfaces and the first and second coupling surfaces, are obtuse angles.

20 Claims, 10 Drawing Sheets

MULTILAYER CERAMIC ELECTRONIC COMPONENT

CROSS REFERENCE TO RELATED APPLICATIONS

This application claims the benefit of priority to Japanese Patent Application No. 2022-021443 filed on Feb. 15, 2022. The entire contents of this application are hereby incorporated herein by reference.

BACKGROUND OF THE INVENTION

1. Field of the Invention

This disclosure relates to a multilayer ceramic electronic component.

Description of the Background Art

Conventionally, multilayer ceramic capacitors are available among the known multilayer ceramic electronic components. Typically, a multilayer ceramic capacitor includes a multilayer body (element body), and an external electrode (terminal electrode). For instance, Japanese Patent Laid-Open No. 2007-142118 describes a multilayer ceramic capacitor having an element body including an inner layer portion and an outer layer portion. The inner layer portion is structured such that inner electrode layers and inner dielectric layers are alternately laminated on each other. The outer layer portion includes outer dielectric layers.

In the multilayer ceramic capacitor described in Japanese Patent Laid-Open No. 2007-142118, the inner layer portion protrudes from the element body more outward than the outer layer portion. Japanese Patent Laid-Open No. 2007-142118 describes, with this structural feature, the terminal electrode may be more suitably formed. The structure described in Japanese Patent Laid-Open No. 2007-142118, however, has a step portion formed at the right angle between the inner layer portion and the outer layer portion. Thus, air bubbles may be more likely to form in the external electrode disposed in the step portion. The air bubbles may lead to poor moisture resistance.

SUMMARY OF THE INVENTION

Preferred embodiments of the present invention provide multilayer ceramic electronic components that each have excellent moisture resistance.

A multilayer ceramic electronic component according to a preferred embodiment of the present invention includes a multilayer body including a plurality of ceramic layers laminated on each other, a plurality of inner conductor layers laminated on the plurality of ceramic layers, a first main surface and a second main surface opposed to each other in a direction of layer lamination, a first lateral surface and a second lateral surface opposed to each other in a direction of width orthogonal or substantially orthogonal to the direction of layer lamination, and a first end surface and a second end surface opposed to each other in a direction of length orthogonal or substantially orthogonal to the direction of layer lamination and the direction of width, a first external electrode on the first end surface and connected to the plurality of inner conductor layers, and a second external electrode on the second end surface and connected to the plurality of inner conductor layers. The multilayer body includes an inner layer portion including a portion of the plurality of ceramic layers and the plurality of inner conductor layers, and a first outer layer portion on a side of the first main surface and a second outer layer portion on a side of the second main surface with the inner layer portion interposed therebetween, the first outer layer portion and the second outer layer portion respectively including any portion of the plurality of ceramic layers except for the portion included in the inner layer portion. The first end surface and the second end surface each include an inner layer end surface including a surface defined by the inner layer portion, a first outer layer end surface including a surface defined by the first outer layer portion, and a second outer layer end surface including a surface defined by the second outer layer portion. The inner layer end surface includes a protruding end surface including a surface at a position that protrudes farther in the direction of length than the first outer layer end surface and the second outer layer end surface, a first coupling surface connecting the first outer layer end surface and the protruding end surface to each other, and a second coupling surface connecting the second outer layer end surface and the protruding end surface to each other. An angle between the first outer layer end surface and the first coupling surface at a boundary between the first outer layer end surface and the first coupling surface is an obtuse angle. An angle between the second outer layer end surface and the second coupling surface at a boundary between the second outer layer end surface and the second coupling surface is an obtuse angle. The plurality of inner conductor layers are exposed on the first coupling surface and the second coupling surface.

According to preferred embodiments of the present invention, multilayer ceramic electronic components that each have excellent moisture resistance are able to be produced and made available.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the drawings.

Preferred Embodiment

Figure 1:
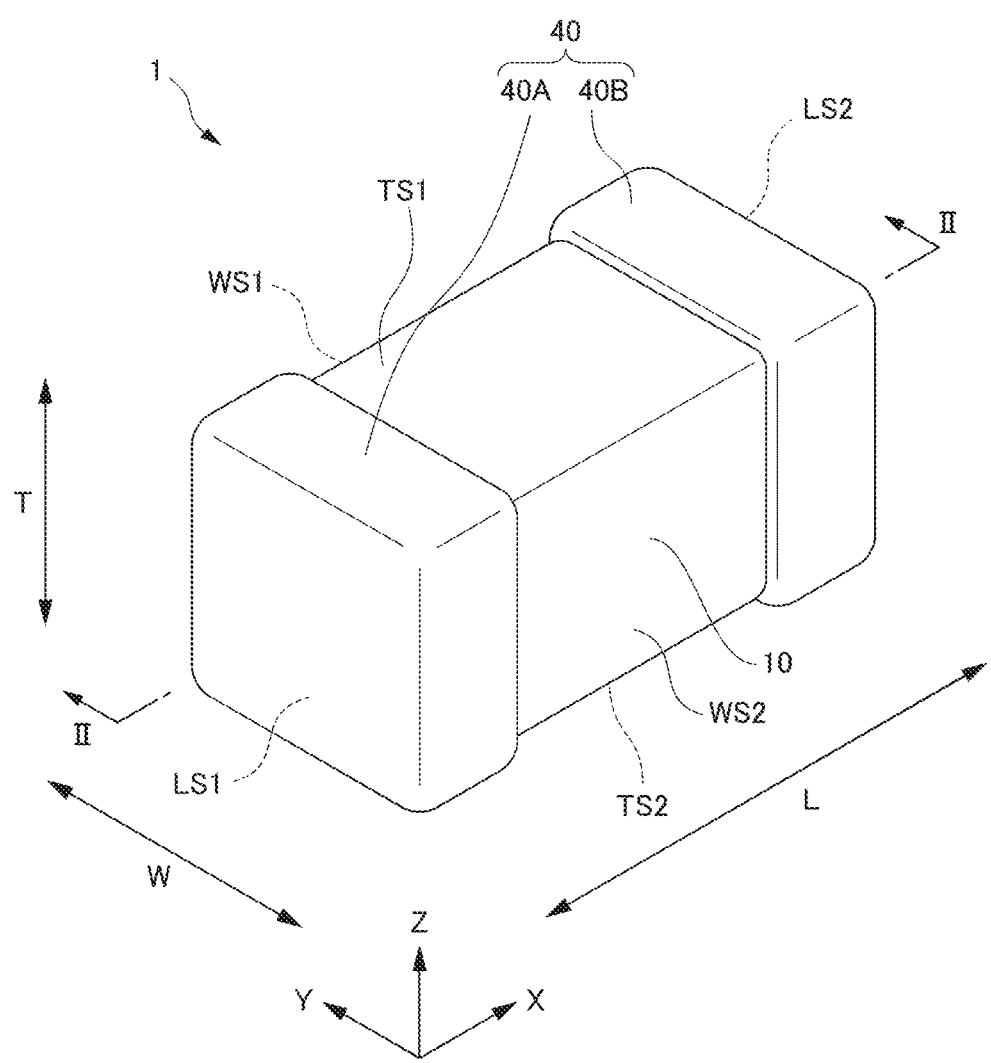
FIG. 1 is an external perspective view of a multilayer ceramic capacitor according to a preferred embodiment of the present invention.
Figure 2:
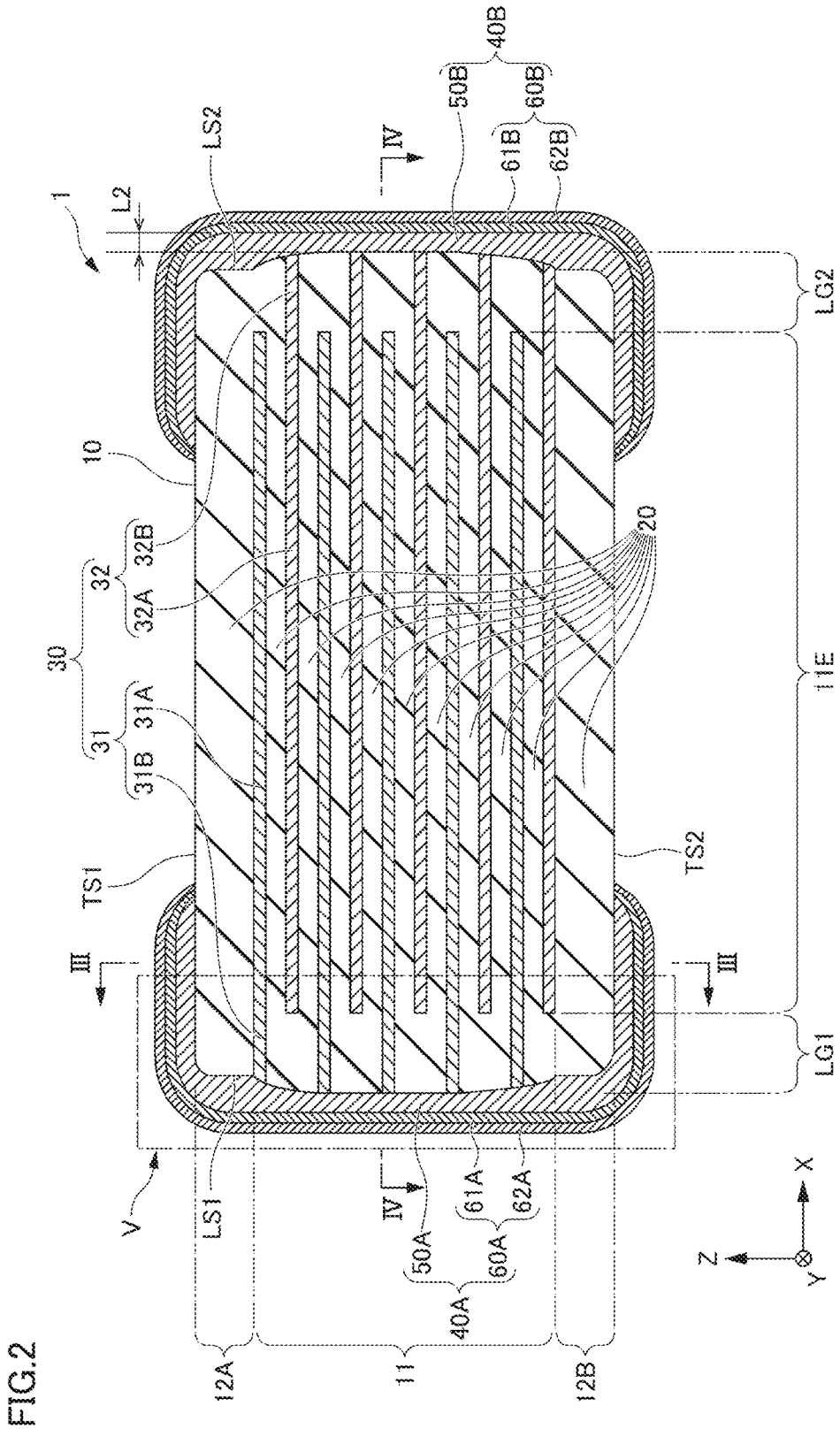
FIG. 2 is a view in cross section of the multilayer ceramic capacitor illustrated in FIG. 1 along II-II line.
Figure 3:
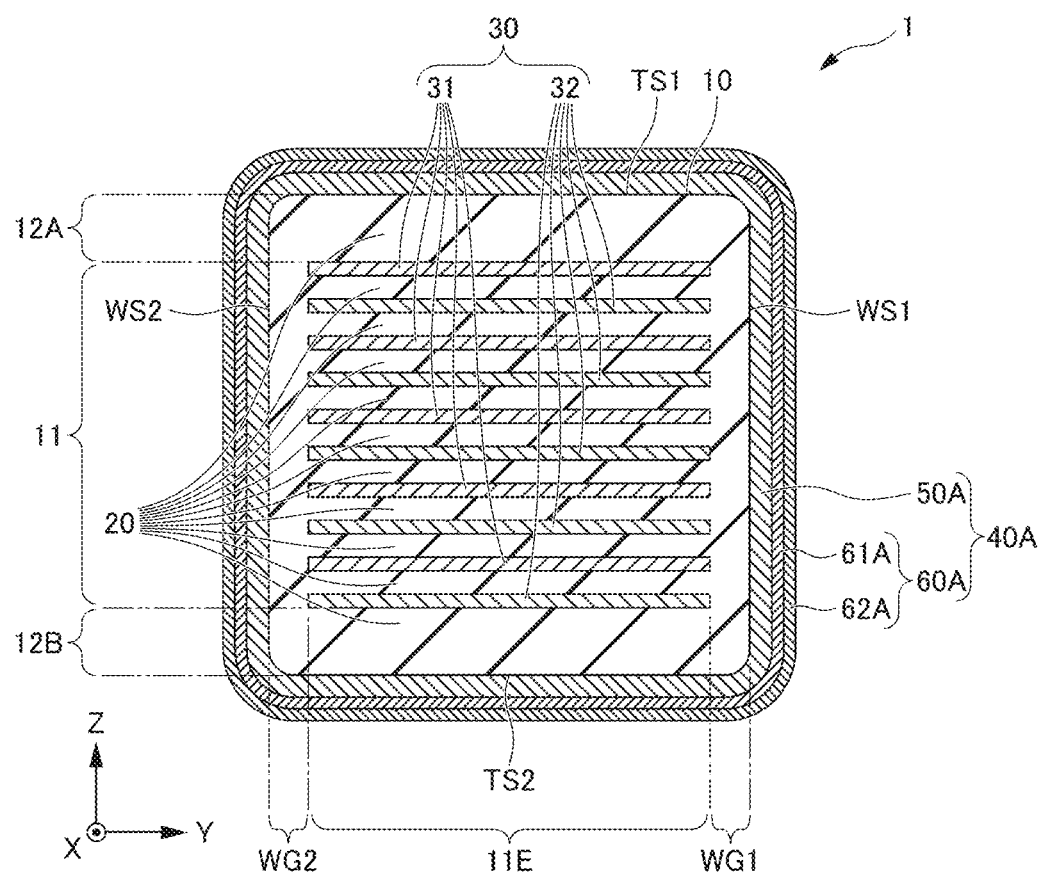
FIG. 3 is a view in cross section of the multilayer ceramic capacitor illustrated in FIG. 2 along line.
Figure 4:
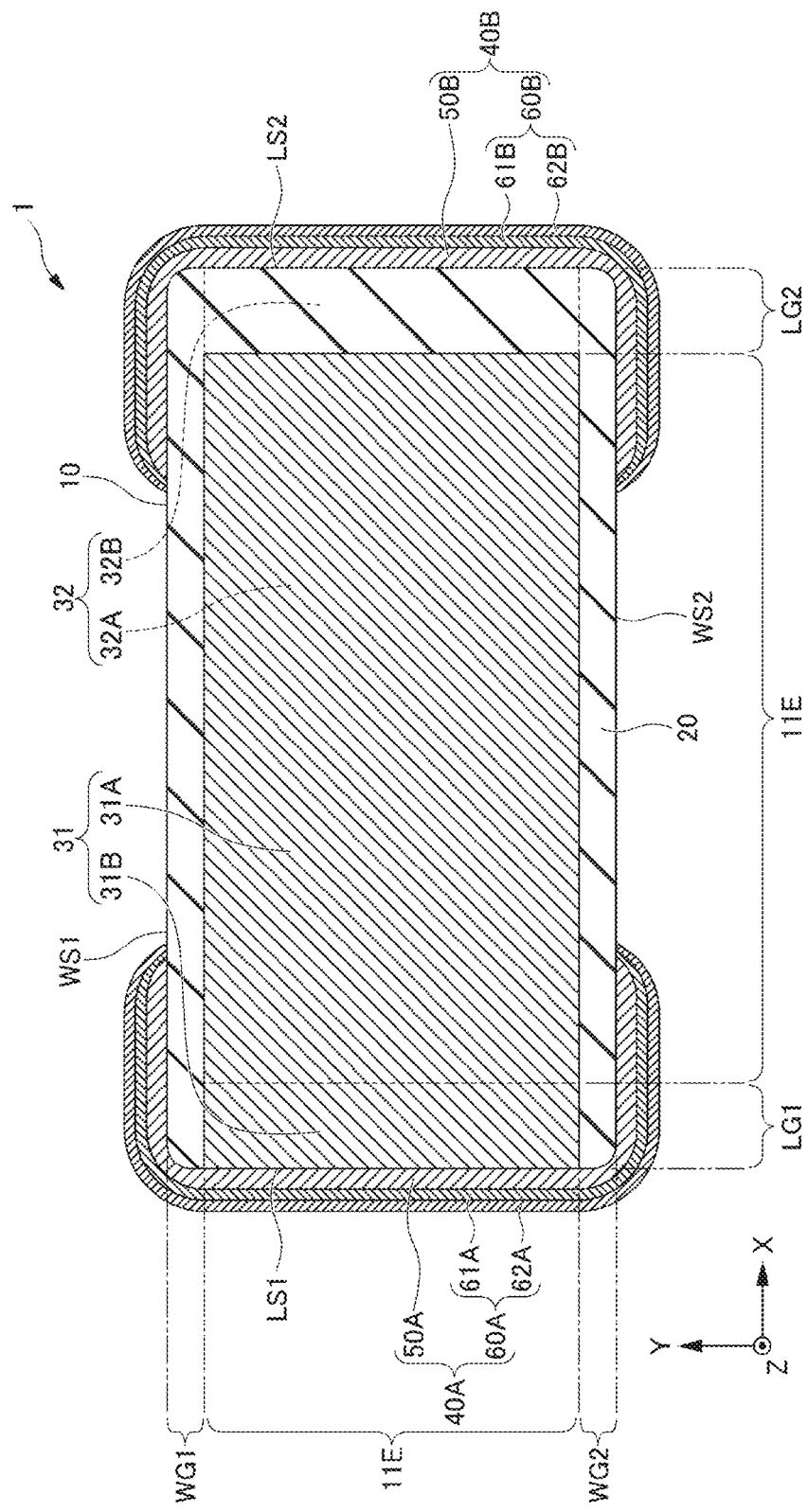
FIG. 4 is a view in cross section of the multilayer ceramic capacitor along IV-IV line in FIG. 2.

A multilayer ceramic capacitor 1 is hereinafter described, which is an example of a multilayer ceramic electronic component according to a preferred embodiment of present invention. FIG. 1 is an external perspective view of multilayer ceramic capacitor 1 according to the present preferred embodiment. FIG. 2 is a view in cross section of multilayer ceramic capacitor 1 along II-II line in FIG. 1. FIG. 3 is a view in cross section of multilayer ceramic capacitor 1 along III-III line in FIG. 2. FIG. 4 is a view in cross section of multilayer ceramic capacitor 1 along IV-IV line in FIG. 2.

Multilayer ceramic capacitor 1 includes a multilayer body 10 and an external electrode 40.

In FIGS. 1 to 7 are illustrated an XYZ orthogonal coordinate system. A direction of length "L" of multilayer ceramic capacitor 1 and multilayer body 10 coincides with X direction. A direction of width "W" of multilayer ceramic capacitor 1 and multilayer body 10 coincides with Y direction. A direction of layer lamination "T" of multilayer ceramic capacitor 1 and multilayer body 10 coincides with Z direction. A cross section illustrated in FIG. 2 may be referred to as LT cross section. A cross section illustrated in FIG. 3 may be referred to as WT cross section. A cross section illustrated in FIG. 4 may be referred to as LW cross section.

As illustrated in FIGS. 1 to 4, multilayer body 10 includes a first main surface TS1 and a second main surface TS2 opposed to each other in a direction of layer lamination "T", a first lateral surface WS1 and a second lateral surface WS2 opposed to each other in a direction of width "W" orthogonal or substantially orthogonal to direction of layer lamination "T", and a first end surface LS1 and a second end surface LS2 opposed to each other in a direction of length "L" orthogonal or substantially orthogonal to direction of layer lamination "T" and direction of width "W".

Multilayer body 10 a rectangular or substantially rectangular solid shape, as illustrated in FIG. 1. The dimension of multilayer body 10 in direction of length "L" is not necessarily greater than the dimension of multilayer body 10 in direction of width "W". Corner portions and ridge portions of multilayer body 10 may preferably be rounded. The corner portion refers to a portion at which three surfaces of multilayer body 10 intersect with one another. The ridge portion refers to a portion at which two surfaces of multilayer body 10 intersect with each other. Multilayer body 10 may have irregularities in part or in whole of its respective surfaces.

The dimensions of multilayer body 10 are not particularly limited. Supposing that "L" is the dimension of multilayer body 10 in direction of length "L", dimension "L" may preferably be, for example, greater than or equal to about 0.2 mm and less than or equal to about 10 mm. Supposing that "T" is the dimension of multilayer body 10 in direction of layer lamination "T", dimension "T" may preferably be, for example, greater than or equal to about 0.1 mm and less than or equal to about 10 mm. Supposing that "W" is the dimension of multilayer body 10 in direction of width "W", dimension "W" may preferably be, for example, greater than or equal to about 0.1 mm and less than or equal to about 5 mm.

As illustrated in FIGS. 2 and 3, multilayer body 10 includes an inner layer portion 11, an outer layer portion 12A on first main surface side (for example, first outer layer portion), and an outer layer portion 12B on second main surface side (for example, second outer layer portion). Outer layer portion 12A on first main surface side and outer layer portion 12B on second main surface side are disposed with inner layer portion 11 interposed therebetween in direction of layer lamination "T".

Inner layer portion 11 includes a plurality of dielectric layers 20 (for example, ceramic layers), and a plurality of inner electrode layers 30 (for example, inner conductor layers). Inner layer portion 11 includes the portion from inner electrode layer 30 located most proximate to first main surface TS1 to inner electrode layer 30 located most proximate to second main surface TS2, in direction of layer lamination "T". In inner layer portion 11, inner electrode layers 30 are disposed with dielectric layers 20 interposed therebetween. Inner layer portion 11 generates an electrostatic capacity and substantively defines and functions as a capacitor. FIGS. 2 and 3 are schematic drawings. Detailed relationships between inner electrode layers 30 and end surfaces of multilayer body 10 will be described later with reference to FIG. 5.

Dielectric layer 20 is made from a dielectric material(s). The dielectric material(s) may be selected from dielectric ceramics including, for example, $BaTiO_3$, $CaTiO_3$, $SrTiO_3$ and/or $CaZrO_3$. The dielectric material(s) may further include, in addition to the substance(s) described above, an accessory ingredient, examples of which include an Mn compound(s), an Fe compound(s), a Cr compound(s), a Co compound(s) and an Ni compound(s).

Dielectric layer 20 may preferably have, for example, a thickness greater than or equal to about 0.2 μm and less than or equal to about 10 μm. The number of laminated dielectric layers 20 may preferably be, for example, greater than or equal to 15 layers and less than or equal to 1200 layers. The number of dielectric layers 20 is equal to the total number of all of the dielectric layers in the following layer portions; inner layer portion 11, outer layer portion 12A on first main surface side and outer layer portion 12B on second main surface.

Inner electrode layers 30 include a plurality of first inner electrode layers 31 and a plurality of second inner electrode layers 32. First inner electrode layers 31 are disposed on dielectric layers 20. Second inner electrode layers 32 are disposed on dielectric layers 20. First inner electrode layer 31 and second inner electrode layer 32 are alternately disposed on each other with dielectric layer 20 interposed therebetween in direction of layer lamination "T" of multilayer body 10. First inner electrode layer 31 and second inner electrode layer 32 face each other across dielectric layer 20.

First inner electrode layers 31 each include a first opposed portion 31A opposed to second inner electrode layer 32, and a first extracted portion 31B extending from first opposed portion 31A onto first end surface LS1. First extracted portion 31B is exposed on first end surface LS1.

Second inner electrode layers 32 each include a second opposed portion 32A opposed to first inner electrode layer 31, and a second extracted portion 32B extending from second opposed portion 32A onto second end surface LS2. Second extracted portion 32B is exposed on second end surface LS2.

In the present preferred embodiment, first opposed portions 31A and second opposed portions 32A are facing each other across dielectric layers 20 to generate an electrostatic capacitance. Thus, the capacitor has desired properties.

First opposed portion 31A and second opposed portion 32A may have any suitable shape. Preferably, for example, these opposed portions may have a rectangular or substantially rectangular shape. The corners of the rectangular or substantially rectangular shape may be rounded or oblique. First extracted portion 31B and second extracted portion 32B may have any suitable shape. Preferably, for example, the extracted portions may have a rectangular or substantially rectangular shape. The corners of the rectangular or substantially rectangular shape may be rounded or oblique.

First opposed portion 31A and first extracted portion 31B may have an equal or substantially equal dimension in direction of width "W", or one of these portions may have a smaller dimension in this direction than the other. Second opposed portion 32A and second extracted portion 32B may have an equal or substantially equal dimension in direction of width "W", or one of these portions may have a smaller dimension in this direction than the other.

First inner electrode layer 31 and second inner electrode layer 32 may be made from an electrically conductive material suitably selected from, for example, Ni, Cu, Ag, Pd, and Au, and alloys including at least one of these metals. In case an alloy is selected, for example, an Ag—Pd alloy may be used for first inner electrode layer 31 and second inner electrode layer 32.

First inner electrode layer 31 and second inner electrode layer 32 may preferably have, for example, a thickness greater than or equal to about 0.2 μm and less than or equal to about 2.0 μm. The number of first inner electrode layers 31 and the number of second inner electrode layers 32, all together, may preferably be, for example, greater than or equal to 15 layers and less than or equal to 1000 layers.

Outer layer portion 12A on first main surface side is disposed on a side closer to first main surface TS1 of multilayer body 10. Outer layer portion 12A on first main surface side defines an aggregate of dielectric layers 20 disposed between first main surface TS1 and inner electrode layer 30 most proximate to first main surface TS1. Dielectric layers 20 of outer layer portion 12A on first main surface side may be made of the same material(s) as used in dielectric layers 20 of inner layer portion 11 or may be obtained from a different kind(s) of material(s).

Outer layer portion 12B on second main surface side is disposed on a side closer to second main surface TS2 of multilayer body 10. Outer layer portion 12B on second main surface side defines an aggregate of dielectric layers 20 disposed between second main surface TS2 and inner electrode layer 30 most proximate to second main surface TS2. Dielectric layers 20 of outer layer portion 12B on second main surface side may be obtained from the same material(s) as used in dielectric layers 20 of inner layer portion 11 or may be obtained from a different kind(s) of material(s).

Multilayer body 10 includes an opposed electrode portion 11E. Opposed electrode portion 11E is where first opposed portion 31A of first inner electrode layer 31 and second opposed portion 32A of second inner electrode layer 32 face each other. Opposed electrode portion 11E defines a portion of inner layer portion 11. FIG. 4 illustrates the ranges of opposed electrode portion 11E in direction of width "W" and in direction of length "L". Opposed electrode portion 11E may otherwise be referred to as a capacitor effective portion.

Multilayer body 10 includes an outer layer portion on lateral surface side. The outer layer portion on lateral surface side includes an outer layer portion WG1 on first lateral surface side and an outer layer portion WG2 on second lateral surface side. Outer layer portion WG1 on first lateral surface side includes dielectric layers 20 between opposed electrode portion 11E and first lateral surface WS1. Outer layer portion WG2 on second lateral surface side includes dielectric layers 20 between opposed electrode portion 11E and second lateral surface WS2. FIGS. 3 and 4 illustrate the ranges of outer layer portion WG1 on first lateral surface side and of outer layer portion WG2 on second lateral surface side in direction of width "W". The outer layer portion on lateral surface side may otherwise be referred to as "W gap" or "side gap".

Multilayer body 10 includes an outer layer portion on end surface side. The outer layer portion on end surface side includes an outer layer portion LG1 on first end surface side and an outer layer portion LG2 on second end surface side. Outer layer portion LG1 on first end surface side includes dielectric layers 20 between opposed electrode portion 11E and first end surface LS1. Outer layer portion LG2 on second end surface side includes dielectric layers 20 between opposed electrode portion 11E and second end surface LS2. FIGS. 2 and 4 illustrate the ranges of outer layer portion LG1 on first end surface side and outer layer portion LG2 on second end surface side in direction of length "L". The outer layer portion on end surface side may otherwise be referred to as "L gap" or "end gap".

External electrode 40 includes a first external electrode 40A disposed on a side closer to first end surface LS1 and a second external electrode 40B disposed on a side closer to second end surface LS2.

First external electrode 40A is disposed on first end surface LS1. First external electrode 40A is connected to first inner electrode layers 31. First external electrode 40A may also be disposed on a portion of first main surface TS1 and a portion of second main surface TS2 and also on a portion of first lateral surface WS1 and a portion of second lateral surface WS2. In the present preferred embodiment, first external electrode 40A is disposed on first end surface LS1 and extends to a portion of first main surface TS1 and a portion of second main surface TS2 and also to a portion of first lateral surface WS1 and a portion of second lateral surface WS2.

Second external electrode 40B is disposed on second end surface LS2. Second external electrode 40B is connected to second inner electrode layers 32. Second external electrode 40B may also be disposed on a portion of first main surface TS1 and a portion of second main surface TS2 and also on a portion of first lateral surface WS1 and a portion of second lateral surface WS2. In the present preferred embodiment, second external electrode 40B is disposed on second end surface LS2 and extends to a portion of first main surface TS1 and a portion of second main surface TS2 and also to a portion of first lateral surface WS1 and a portion of second lateral surface WS2.

In multilayer body 10, first opposed portion 31A of first inner electrode layer 31 and second opposed portion 32A of second inner electrode layer 32 are opposed to each other with dielectric layer 20 interposed therebetween, as described earlier. This structural feature generates an electrostatic capacitance. Thus, the capacitor has desired properties between first external electrode 40A connected to first inner electrode layers 31 and second external electrode 40B connected to second inner electrode layers 32.

First external electrode 40A includes a first base electrode layer 50A and a first plating layer 60A provided on first base electrode layer 50A.

Second external electrode 40B includes a second base electrode layer 50B and a second plating layer 60B provided on second base electrode layer 50B.

First base electrode layer 50A is disposed on first end surface LS1. First base electrode layer 50A is connected to first inner electrode layers 31. In the present preferred embodiment, first base electrode layer 50A is disposed on first end surface LS1 and extends to a portion of first main surface TS1 and a portion of second main surface TS2 and also to a portion of first lateral surface WS1 and a portion of second lateral surface WS2.

Second base electrode layer 50B is disposed on second end surface LS2. Second base electrode layer 50B is connected to second inner electrode layers 32. In the present preferred embodiment, second base electrode layer 50B is disposed on second end surface LS2 and extends to a portion of first main surface TS1 and a portion of second main surface TS2 and also to a portion of first lateral surface WS1 and a portion of second lateral surface WS2.

First base electrode layer 50A and second base electrode layer 50B each include, for example, at least one of a baked layer, an electrically conductive resin layer, and a thin film layer.

In the present preferred embodiment, first base electrode layer 50A and second base electrode layer 50B includes a baked layer. The baked layer may include, for example, a metallic component and one of a glass component and a ceramic component or preferably both of them. The metallic component includes at least one selected from, for example, Cu, Ni, Ag, Pd, Ag—Pd alloys, and Au. The glass component includes at least one selected from, for example, B, Si, Ba, Mg, Al, and Li. The ceramic component may be the same ceramic material as used in dielectric layer 20 or may be a different type(s) of ceramic material(s). The ceramic component includes, for example, at least one selected from $BaTiO_3$, $CaTiO_3$, $(Ba, Ca)TiO_3$, $SrTiO_3$, and $CaZrO_3$.

To form the baked layer, an electrically conductive paste including a glass component and a metal(s), for example, is applied to the multilayer body and then baked. The baked layer may be obtained as described below; a multilayer chip including inner electrodes and dielectric layers and an electrically conductive paste applied to the multilayer chip are baked all together, or a multilayer chip including inner electrodes and dielectric layers is baked to obtain a multilayer body, and the multilayer body thus obtained is coated with an electrically conductive paste and then baked. When a multilayer chip including inner electrodes and dielectric layers and an electrically conductive paste applied to the multilayer chip are baked all together, a material including a ceramic component instead of the glass component may preferably be applied to the multilayer chip and then baked. It may be particularly preferable to use, as the ceramic material added, the same ceramic material as used in dielectric layer 20. The base electrode layer may include a plurality of baked layers.

A thickness "L2" in the direction of length of first base electrode layer 50A disposed on first end surface LS1 may preferably be, for example, greater than or equal to about 3 µm and less than or equal to about 160 µm at the center or substantially at the center of first base electrode layer 50A in direction of layer lamination "T" and in direction of width "W". Thickness "L2" may more preferably be, for example, greater than or equal to about 10 µm and less than or equal to about 100 µm.

A thickness "L2" in the direction of length of second base electrode layer 50B disposed on second end surface LS2 may preferably be, for example, greater than or equal to about 3 µm and less than or equal to about 160 µm at the center or substantially at the center of second base electrode layer 50B in direction of layer lamination "T" and in direction of width "W". Thickness "L2" may more preferably be, for example, greater than or equal to about 10 µm and less than or equal to about 100 µm.

In case first base electrode layer 50A is disposed also on a portion of at least one of first main surface TS1 and second main surface TS2, first base electrode layer 50A in the portion of the first and/or second main surface(s) may preferably have a thickness, for example, greater than or equal to about 3 µm and less than or equal to about 40 µm in the direction of layer lamination at the center or substantially at the center of first base electrode layer 50A in direction of length "L" and in direction of width "W".

In case first base electrode layer 50A is disposed also on a portion of at least one of first lateral surface WS1 and second lateral surface WS2, first base electrode layer 50A in the portion of the first and/or second lateral surface(s) may preferably have a thickness, for example, greater than or equal to about 3 µm and less than or equal to about 40 µm in the direction of width at the center or substantially at the center of first base electrode layer 50A in direction of length "L" and in direction of layer lamination "T".

In case second base electrode layer 50B is disposed also on a portion of at least one of first main surface TS1 and second main surface TS2, second base electrode layer 50B in the portion of the first and/or second main surface(s) may preferably have a thickness, for example, greater than or equal to about 3 µm and less than or equal to about 40 µm in the direction of layer lamination at the center or substantially at the center of second base electrode layer 50B in direction of length "L" and in direction of width "W".

In case second base electrode layer 50B is disposed also on a portion of at least one of first lateral surface WS1 and second lateral surface WS2, second base electrode layer 50B in the portion of the first and/or second lateral surface(s) may preferably have a thickness, for example, greater than or equal to about 3 µm and less than or equal to about 40 µm in the direction of width at the center or substantially at the center of second base electrode layer 50B in direction of length "L" and in direction of layer lamination "T".

In the present preferred embodiment, first base electrode layer 50A and second base electrode layer 50B may not necessarily include the baked layer. First base electrode layer 50A and second base electrode layer 50B each include at least one selected from, for example, a baked layer, an electrically conductive resin layer and a thin film layer. For instance, first base electrode layer 50A and second base electrode layer 50B may include a thin film layer. The thin film layer may be formed by, for example, sputtering or vapor deposition. The thin film layer may be, for example, less than or equal to about 1 µm in thickness in which metallic particles are deposited.

First plating layer 60A covers first base electrode layer 50A.

Second plating layer 60B covers second base electrode layer 50B.

First plating layer 60A and second plating layer 60B may include at least one selected from, for example, Cu, Ni, Sn, Ag, Pd, Ag—Pd alloys, and Au. First plating layer 60A and second plating layer 60B may each preferably include a plurality of layers. First plating layer 60A and second plating layer 60B may each preferably have a bi-layered structure including, for example, an Ni-plated layer and an Sn-plated layer provided thereon.

In the present preferred embodiment, for example, first plating layer 60A includes a first Ni-plated layer 61A and a first Sn-plated layer 62A provided on first Ni-plated layer 61A.

In the present preferred embodiment, second plating layer 60B includes, for example, a second Ni-plated layer 61B and a second Sn-plated layer 62B provided on second Ni-plated layer 61B.

The Ni-plated layer may prevent possible erosion of first base electrode layer 50A and second base electrode layer 50B caused by a soldering material used to mount multilayer ceramic capacitor 1. The Sn-plated layer may improve solder wettability during the mounting of multilayer ceramic capacitor 1. The advantages of these layers may help to facilitate the mounting process of multilayer ceramic capacitor 1. First Ni-plated layer 61A, first Sn-plated layer 62A, second Ni-plated layer 61B and second Sn-plated layer 62B may each preferably have a thickness, for example, greater than or equal to about 2 μm and less than or equal to about 15 μm.

First external electrode 40A and second external electrode 40B according to the present preferred embodiment may each include an electrically conductive resin layer including, for example, electrically conductive particles and a thermosetting resin(s). In case an electrically conductive resin layer is provided as the base electrode layer (first base electrode layer 50A, second base electrode layer 50B), the electrically conductive resin layer may cover the baked layer or may be directly provided on multilayer body 10 in the absence of the baked layer. The electrically conductive resin layer, when covering the baked layer, is disposed between the base electrode layer and the plating layer (first plating layer 60A, second plating layer 60B). The electrically conductive resin layer may cover the entire or a portion of the plating layer.

Two or more electrically conductive resin layers may be provided. The thickness of the electrically conductive resin layer in its thickest portion may preferably be, for example, greater than or equal to about 10 μm and less than or equal to about 150 μm.

Optionally, first plating layer 60A and second plating layer 60B may be directly provided on multilayer body 10, as described later, without first base electrode layer 50A or second base electrode layer 50B. Specifically, multilayer ceramic capacitor 1 may include a plating layer which is directly electrically connected to first inner electrode layers 31 and second inner electrode layers 32. In this instance, the plating layer may be formed after a catalyst is applied to the surface of multilayer body 10 as pretreatment.

In this instance, two or more plating layers may preferably be provided. These plating layers (for example, upper and lower plating layers) may preferably include, for example, at least one selected from Cu, Ni, Sn, Pb, Au, Ag, Pd, Bi and Zn, and alloys including one or more of these metals. The lower plating layer may preferably be made from, for example, Ni that defines and functions as a barrier against solder. The upper plating layer may preferably be made from, for example, Sn or Au that excels in solder wettability. In case Ni is used to for first inner electrode layers 31 and second inner electrode layers 32, for example, Cu that bonds well to Ni may preferably be used for the lower plating layer. The upper plating layer may be optionally provided depending on the need. External electrode 40 may solely include the lower plating layer alone. The plating layer may include the upper plating layer as its outermost layer or may further include a plating layer(s) on the surface of the upper plating layer.

The thickness of the plating layer in the absence of the base electrode layer may preferably be, for example, greater than or equal to about 2 μm and less than or equal to about 15 μm for one layer. The plating layer may preferably include no glass. The ratio of a metal(s) per unit volume of the plating layer may preferably be, for example, greater than or equal to about 99 percent by volume.

When the plating layer is directly provided on multilayer body 10, the base electrode layer may be reduced in thickness. As a result of this thickness reduction of the base electrode layer, multilayer ceramic capacitor 1 may be reduced in direction of layer lamination "T", so as to reduce the height of multilayer ceramic capacitor 1. The thickness reduction of the base electrode layer may enable a thickness increase of dielectric layers 20 in thickness between first inner electrode layers 31 and second inner electrode layers 32. Direct formation of the plating layer on multilayer body 10 may result in a higher degree of freedom in designing the multilayer ceramic capacitor.

The layers defining first external electrode 40A and second external electrode 40B have the same or substantially the same basic features. First external electrode 40A and second external electrode 40B are symmetrical or substantially symmetrical to each other with respect to the WT cross section at substantially the center of multilayer ceramic capacitor 1 in direction of length "L". Thus, first external electrode 40A and second external electrode 40B may be hereinafter collectively referred to as external electrode 40, unless these first and second external electrodes 40A and 40B need to be described distinctively from each other. Similarly, first end surface LS1 and second end surface LS2 of multilayer body 10 may be collectively referred to as end surface LS, unless these first and second end surfaces LS1 and LS2 need to be described distinctively from each other.

Supposing that "L" is the dimension, in the direction of length, of multilayer ceramic capacitor 1 including multilayer body 10 and external electrode 40, dimension "L" may preferably be, for example, greater than or equal to about 0.2 mm and less than or equal to about 10 mm. Supposing that "T" is the dimension of multilayer ceramic capacitor 1 in a direction of height, dimension "T" may preferably be, for example, greater than or equal to about 0.1 mm and less than or equal to about 10 mm. Supposing that "W" is the dimension of multilayer ceramic capacitor 1 in direction of width "W", dimension "W" may preferably be, for example, greater than or equal to about 0.1 mm and less than or equal to about 5 mm.

Figure 5:
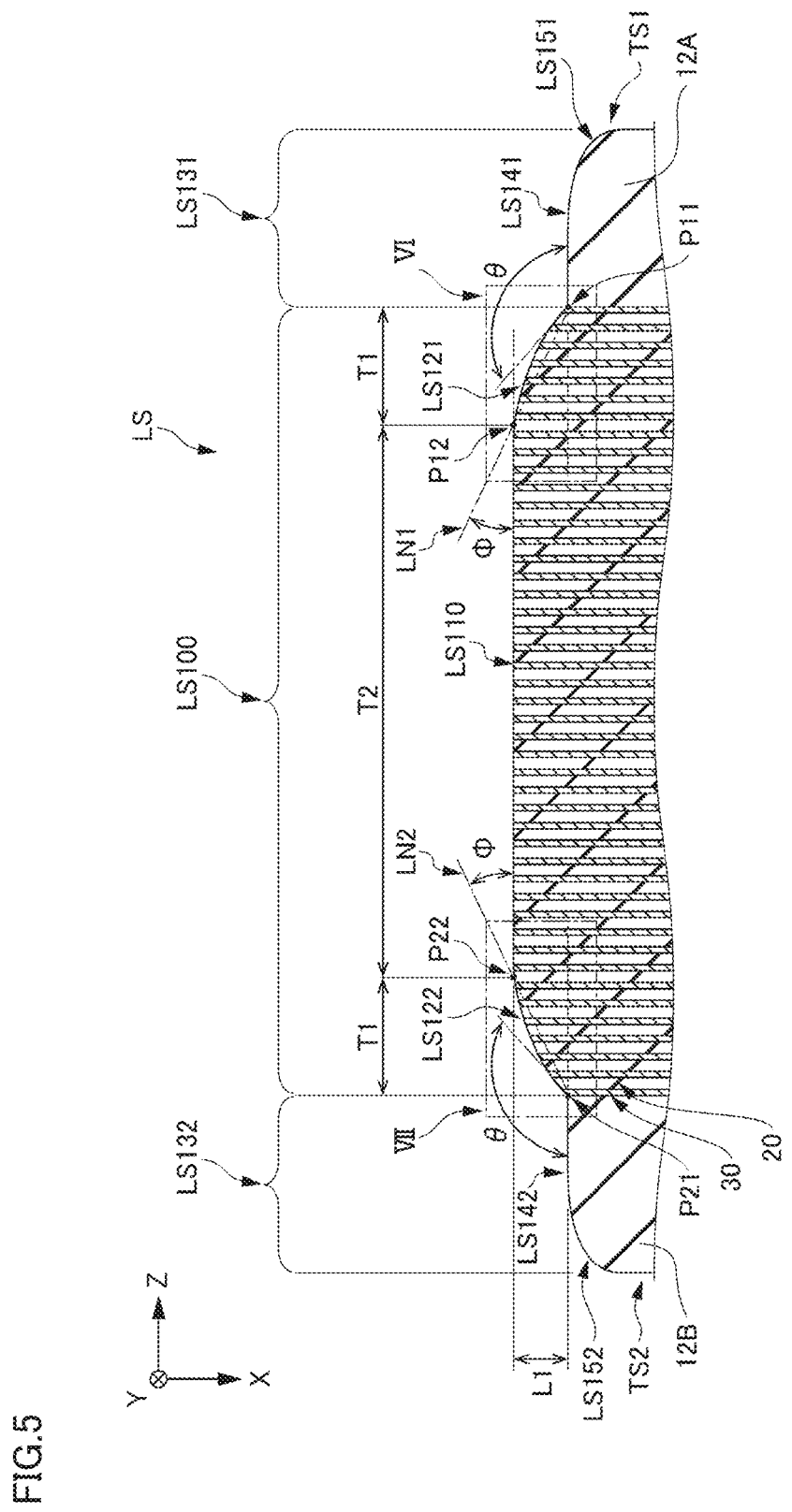
FIG. 5 is an enlarged view in cross section of a portion "V" in the multilayer ceramic capacitor of FIG. 2, illustrating a virtual cross section near an end surface of a multilayer body from which an external electrode has been removed.
Figure 6:
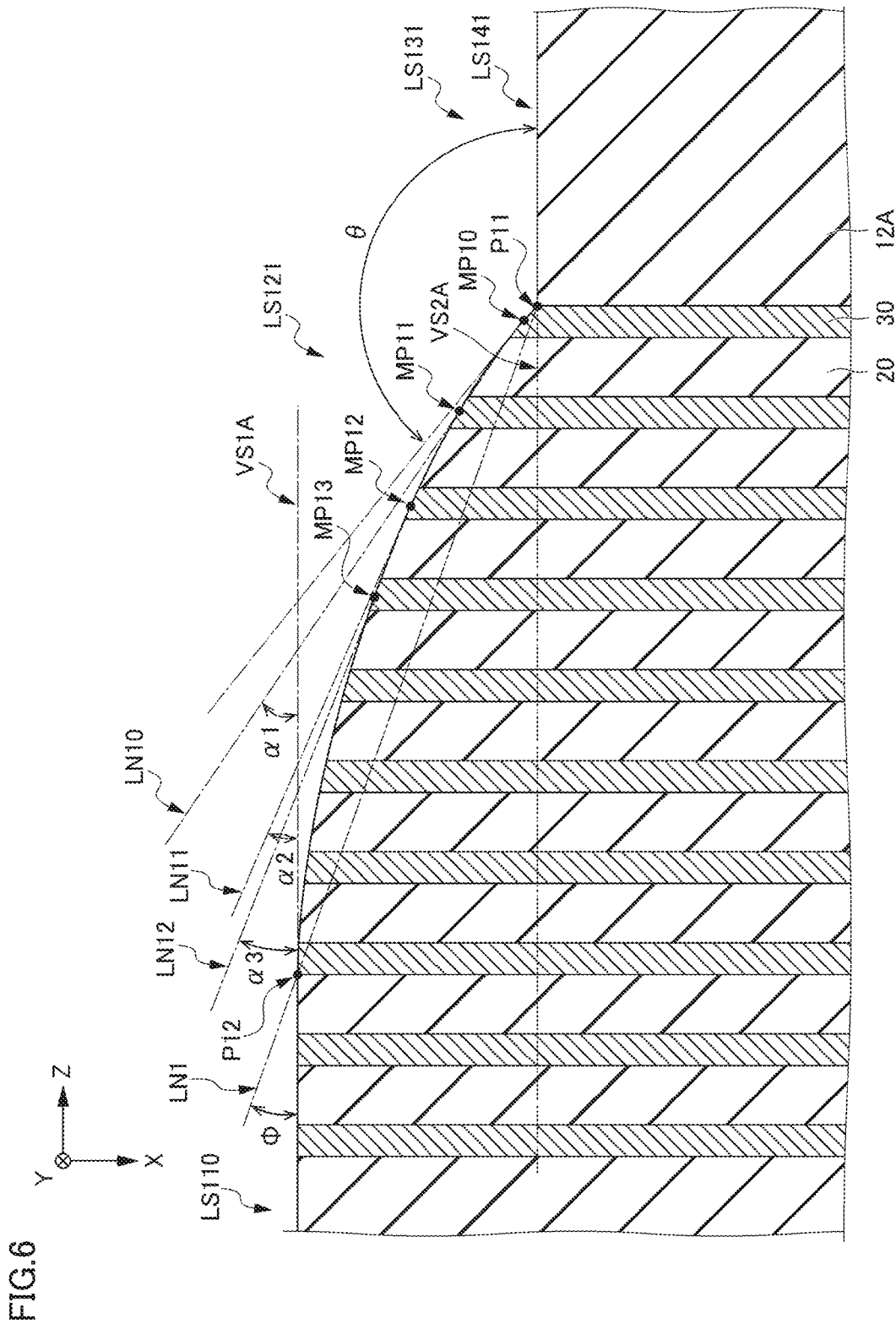
FIG. 6 is an enlarged view in cross section of a portion "VI" near an end surface of the multilayer body of FIG. 5, illustrating a schematic cross section around a first coupling surface.
Figure 7:
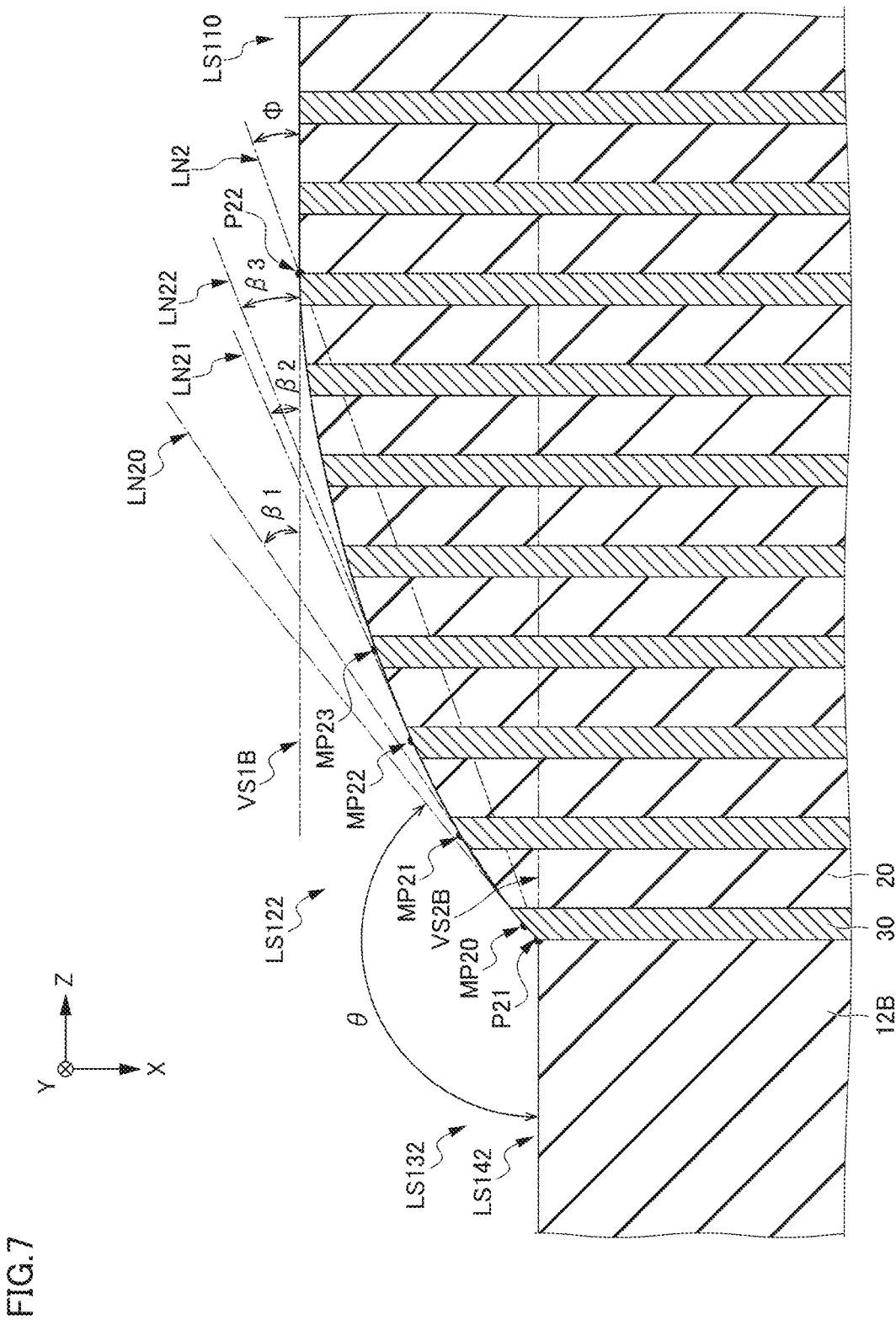
FIG. 7 is an enlarged view in cross section of a portion "VII" near an end surface of the multilayer body of FIG. 5, illustrating a schematic cross section around a second coupling surface.

In the description provided below with reference to FIGS. 5 to 7, first end surface LS1 and second end surface LS2 are collectively referred to as end surface LS, as described earlier. FIG. 5 is an enlarged view in cross section of a portion "V" in the multilayer ceramic capacitor of FIG. 2, illustrating a virtual cross section near an end surface of the multilayer body from which the external electrode has been removed. The upper side illustrated in FIG. 5 is the end surface side of the multilayer body. FIG. 6 is an enlarged view in cross section of a portion "VI" near an end surface of the multilayer body of FIG. 5, illustrating a schematic cross section around the first coupling surface. FIG. 7 is an enlarged view in cross section of a portion "VII" near an end surface of the multilayer body of FIG. 5, illustrating a schematic cross section around the second coupling surface.

End surface LS of the multilayer body includes an inner layer end surface LS100, a first outer layer end surface LS131, and a second outer layer end surface LS132, as illustrated in FIG. 5. Inner layer end surface LS100 includes a surface defined by inner layer portion 11. First outer layer end surface LS131 includes a surface defined by outer layer portion 12A on first main surface side. Second outer layer end surface LS132 includes a surface defined by outer layer portion 12B on second main surface side.

First outer layer end surface LS131 and second outer layer end surface LS132 may each preferably include a flat or substantially flat surface. As illustrated in FIG. 5, first outer layer end surface LS131 may include a flat surface portion LS141 and a rounded curved surface portion LS151 rounded. Flat surface portion LS141 is provided on the side of inner layer end surface LS100. Curved surface portion LS151 is provided on the side of first main surface TS1. Second outer layer end surface LS132 may include a flat surface portion LS142 and a rounded curved surface portion LS152. Flat surface portion LS142 is provided on the side of inner layer end surface LS100. Curved surface portion LS152 is provided on the side of second main surface TS2.

Inner layer end surface LS100 includes a protruding end surface LS110, a first coupling surface LS121 and a second coupling surface LS122. Protruding end surface LS110 includes a surface at a position that protrudes farther in the direction of length than first outer layer end surface LS131 and second outer layer end surface LS132. First coupling surface LS121 is defined by a surface that connects first outer layer end surface LS131 and protruding end surface LS110 to each other. Second coupling surface LS122 is defined by a surface that connects second outer layer end surface LS132 and protruding end surface LS110 to each other.

Protruding end surface LS110 may preferably be a flat or substantially flat surface. An amount of protrusion "L1" of protruding end surface LS110 relative to first outer layer end surface LS131 may preferably be, for example, greater than or equal to about 5 μm and less than or equal to about 50 μm. The amount of protrusion "L1" may more preferably be, for example, greater than or equal to about 10 μm and less than or equal to about 40 μm. An amount of protrusion "L1" of protruding end surface LS110 relative to second outer layer end surface LS132 may preferably be, for example, greater than or equal to about 5 μm and less than or equal to about 50 μm. The amount of protrusion "L1" may more preferably be, for example, greater than or equal to about 10 μm and less than or equal to about 40 μm. These values of the amount of protrusion may preferably be, for example, greater than or equal to about 5% and less than or equal to about 50% of thickness "L2" of the base electrode layer in the direction of length at substantially the center of the base electrode layer in direction of layer lamination "T" and in direction of width "W". A plurality of inner electrode layers 30 are exposed on protruding end surface LS110.

First coupling surface LS121 and second coupling surface LS122 are defined by a curved surface or an inclined plane. In the present preferred embodiment, first coupling surface LS121 and second coupling surface LS122 are defined by a bulging curved surface, as illustrated in FIGS. 5 to 7.

Specifically, first coupling surface LS121 is defined by a curved surface with an angle of inclination that reduces toward protruding end surface LS110 from a boundary P11 between first coupling surface LS121 and first outer layer end surface LS131. This angle of inclination is defined by an angle between first coupling surface LS121 and a virtual surface VS2A resulting from extension of first outer layer end surface LS131 toward inner layer end surface LS100. In case first outer layer end surface LS131 and protruding end surface LS110 are parallel or substantially parallel to each other, the angle of inclination may be defined otherwise, such as defined by an angle between first coupling surface LS121 and a virtual surface VS1A resulting from extension of protruding end surface LS110 toward first main surface TS1.

Specifically, second coupling surface LS122 is defined by a curved surface with an angle of inclination that reduces toward protruding end surface LS110 from a boundary P21 between second coupling surface LS122 and second outer layer end surface LS132. This angle of inclination is defined by an angle between second coupling surface LS122 and a virtual surface VS2B resulting from extension of second outer layer end surface LS132 toward inner layer end surface LS100. In case second outer layer end surface LS132 and protruding end surface LS110 are parallel or substantially parallel to each other, the angle of inclination may be defined otherwise, such as defined by an angle between second coupling surface LS122 and a virtual surface VS1B resulting from extension of protruding end surface LS110 toward second main surface TS2.

Optionally, first coupling surface LS121 and protruding end surface LS110 may be smoothly coupled to each other with a curved surface, as illustrated in FIGS. 5 to 7. Further, second coupling surface LS122 and protruding end surface LS110 may be smoothly coupled to each other with a curved surface.

As illustrated in FIG. 5, first coupling surface LS121 and second coupling surface LS122 may be a surface in the form of a saturation curve when viewed in the LT cross section. Specifically, first coupling surface LS121, when viewed in the LT cross section, may be in the form of a saturation curve that extends toward protruding end surface LS110 from boundary P11 between first coupling surface LS121 and first outer layer end surface LS131. Second coupling surface LS122, when viewed in the LT cross section, may be in the form of a saturation curve that extends toward protruding end surface LS110 from boundary P21 between second coupling surface LS122 and second outer layer end surface LS132. Examples of the saturation curve described herein may include, for example, sigmoid curves.

A length "T1" of first coupling surface LS121 and second coupling surface LS122 in direction of layer lamination "T" may preferably be, for example, greater than or equal to about 2% and less than or equal to about 40% of a length "T2" of inner layer end surface LS100 in direction of layer lamination "T". Length "T1" may more preferably be, for example, greater than or equal to about 5% and less than or equal to about 40% of the length.

Inner electrode layers 30 are exposed on first coupling surface LS121 and second coupling surface LS122. The number of inner electrode layers 30 exposed on first coupling surface LS121, second coupling surface LS122 may preferably be, for example, greater than or equal to three layers, more preferably, for example, greater than or equal to five layers, and even more preferably, for example, greater than or equal to seven layers. The number of inner electrode layers 30 exposed on first coupling surface LS121, second coupling surface LS122 may be, for example, less than or equal to 50 layers.

An angle θ between first outer layer end surface LS131 and first coupling surface LS121 at boundary P11 between first outer layer end surface LS131 and first coupling surface LS121 is an obtuse angle, as illustrated in FIGS. 5 and 6. An angle θ between second outer layer end surface LS132 and second coupling surface LS122 at boundary P21 between second outer layer end surface LS132 and second coupling surface LS122 is an obtuse angle, as illustrated in FIGS. 5 and 7.

Angle θ between first outer layer end surface LS131 and first coupling surface LS121 at boundary P11 between first outer layer end surface LS131 and first coupling surface LS121 may preferably be, for example, greater than or equal to about 120° and less than or equal to about 170°, more preferably, for example, greater than or equal to about 120° and less than or equal to about 160°, and even more preferably, for example, greater than or equal to about 130° and less than or equal to about 160°.

Angle θ between second outer layer end surface LS132 and second coupling surface LS122 at boundary P21 between second outer layer end surface LS132 and second coupling surface LS122 may preferably be, for example, greater than or equal to about 120° and less than or equal to about 170°, more preferably, for example, greater than or equal to about 120° and less than or equal to about 160°, and even more preferably, for example, greater than or equal to about 130° and less than or equal to about 160°.

An angle Φ between protruding end surface LS110 and a first virtual surface resulting from extension of first coupling surface LS121 toward protruding end surface LS110 may preferably be, for example, greater than an angle between protruding end surface LS110 and first outer layer end surface LS131. An angle Φ between protruding end surface LS110 and a second virtual surface resulting from extension of second coupling surface LS122 toward protruding end surface LS110 may preferably be, for example, greater than an angle between protruding end surface LS110 and second outer layer end surface LS132.

As illustrated in FIG. 5, protruding end surface LS110 and first outer layer end surface LS131 may preferably be parallel or substantially parallel to each other. As illustrated in FIG. 5, protruding end surface LS110 and second outer layer end surface LS132 may preferably be parallel substantially parallel to each other. The angle between first outer layer end surface LS131 and protruding end surface LS110 is taken as 0° when first outer layer end surface LS131 and protruding end surface LS110 are parallel to each other. The angle between second outer layer end surface LS132 and protruding end surface LS110 is taken as 0° when second outer layer end surface LS132 and protruding end surface LS110 are parallel to each other.

In case first coupling surface LS121 is a curved surface, the angle of first coupling surface LS121 is defined based on a straight line LN1 that connects boundary P11 between first coupling surface LS121 and first outer layer end surface LS131 to a boundary P12 between first coupling surface LS121 and protruding end surface LS110, and angle Φ described earlier is then defined.

In case second coupling surface LS122 is a curved surface, the angle of second coupling surface LS122 is defined based on a straight line LN2 that connects boundary P21 between second coupling surface LS122 and second outer layer end surface LS132 to a boundary P22 between second coupling surface LS122 and protruding end surface LS110, and angle Φ described above is then defined.

In case first outer layer end surface LS131 and second outer layer end surface LS132 include a flat surface portion and a curved surface portion, the angles described above are measured based on the flat surface portion.

In first coupling surface LS121, supposing that α1 is an angle between virtual surface VS1A resulting from extension of protruding end surface LS110 toward first main surface TS1 and a line of extension LN10 from a straight line that connects the following exposed surfaces of inner electrode layers 30 to each other, an exposed surface of inner electrode layer 30 exposed at a position most proximate to first main surface TS1, and an exposed surface of inner electrode layer 30 exposed at a second position more proximate to second main surface TS2 than first main surface TS1, angle α1 may preferably be, for example, greater than or equal to about 20° and less than or equal to about 60°, as illustrated in FIG. 6. Angle α1 may more preferably is, for example, greater than or equal to about 20° and less than or equal to about 50°. To define the straight line described above, the center position of an opening defined by adjacent ones of dielectric layers 20 on an end surface contour of multilayer body 10 is taken as the representative position of the exposed surface of inner electrode layer 30. More specifically, in first coupling surface LS121, the straight line that defines line of extension LN10 connects the following positions: a center position MP10 of an opening as the representative position of the exposed surface of inner electrode layer 30 exposed at the position most proximate to first main surface TS1, and a center position MP11 of an opening as the representative position of the exposed surface of inner electrode layer 30 exposed at a second position more proximate to second main surface TS2 than first main surface TS1.

In second coupling surface LS122, supposing that "β1" is an angle between virtual surface VS1B resulting from extension of protruding end surface LS110 toward second main surface TS2 and a line of extension LN20 from a straight line that connects the following exposed surfaces of inner electrode layers 30 to each other, an exposed surface of inner electrode layer 30 exposed at a position most proximate to second main surface TS2, and an exposed surface of inner electrode layer 30 exposed at a second position more proximate to first main surface TS1 than second main surface TS2, angle "β1" may preferably be, for example, greater than or equal to about 20° and less than or equal to about 60°, as illustrated in FIG. 7. Angle "β1" may more preferably be, for example, greater than or equal to about 20° and less than or equal to about 50°. In second coupling surface LS122, the straight line that defines line of extension LN20 connects the following positions: a center position MP20 of an opening as the representative position of the exposed surface of inner electrode layer 30 exposed at the position most proximate to second main surface TS2, and a center position MP21 of an opening as the representative position of the exposed surface of inner electrode layer 30 exposed at a second position more proximate to first main surface TS1 than second main surface TS2.

As described above, first coupling surface LS121 and second coupling surface LS122 are each defined by a curved surface, as illustrated in FIG. 6. Supposing that, in first coupling surface LS121, α1 is an angle between protruding end surface LS110 and line of extension LN10 from a straight line that connects the following exposed surfaces of inner electrode layers 30 to each other; an exposed surface of inner electrode layer 30 exposed at the position most proximate to first main surface TS1, and an exposed surface of inner electrode layer 30 exposed at a second position more proximate to second main surface TS2 than first main surface TS1 and that "α2" is an angle between protruding end surface LS110 with line of extension LN11 from a straight line that connects the following exposed surfaces of inner electrode layers 30 to each other; an exposed surface of inner electrode layer 30 exposed at the second position more proximate to second main surface TS2 than first main surface TS1, and an exposed surface of inner electrode layer 30 exposed at a third position more proximate to second main surface TS2 than first main surface TS1, the relationship of α1>α2 may preferably be satisfied. More specifically, in first coupling surface LS121, the straight line that defines line of extension LN11 connects the following positions: a center position MP11 of an opening as the representative position of the exposed surface of inner electrode layer 30 exposed at the second position more proximate to second main surface TS2 than first main surface TS1, and a center position MP12 of an opening as the representative position of the exposed surface of inner electrode layer 30 exposed at the third position more proximate to second main surface TS2 than first main surface TS1.

As illustrated in FIG. 7, supposing that, in second coupling surface LS122, "β1" is an angle between protruding end surface LS110 and line of extension LN20 from a straight line that connects the following exposed surfaces of inner electrode layers 30 to each other: an exposed surface of inner electrode layer 30 exposed at the position most proximate to second main surface TS2, and an exposed surface of inner electrode layer 30 exposed at a second position more proximate to first main surface TS1 than second main surface TS2 and that "β2" is an angle between protruding end surface LS110 and a line of extension LN21 from a straight line that connects the following exposed surfaces of inner electrode layers 30 to each other, an exposed surface of inner electrode layer 30 exposed at the second position more proximate to first main surface TS1 than second main surface TS2, and an exposed surface of inner electrode layer 30 exposed at a third position more proximate to first main surface TS1 than second main surface TS2, the relationship of β1>β2 may preferably be satisfied. More specifically, in second coupling surface LS122, the straight line that defines line of extension LN21 connects the following positions: center position MP21 of an opening as the representative position of the exposed surface of inner electrode layer 30 exposed at the second position more proximate to first main surface TS1 than second main surface TS2, and a center position MP22 of an opening as the representative position of the exposed surface of inner electrode layer 30 exposed at the third position more proximate to first main surface TS1 than second main surface TS2.

Angles "α2" and "β2" may preferably be smaller than angles "α1" and "β1", specifically, for example, greater than or equal to about 5° and less than or equal to about 50°. Angles "α2" and "β2" may more preferably be, for example, greater than or equal to about 5° and less than or equal to about 40°.

Supposing that "α3" is an angle between protruding end surface LS110 and a line of extension LN12 from a straight line that connects the following exposed surfaces of inner electrode layers 30 to each other, an exposed surface of inner electrode layer 30 exposed at the third position more proximate to second main surface TS2 than first main surface TS1, and an exposed surface of inner electrode layer 30 exposed at a fourth position more proximate to second main surface TS2 than first main surface TS1, the relationship of α1>α2>α3 may preferably be satisfied. More specifically, in first coupling surface LS121, the straight line that defines line of extension LN12 connects the following positions: center position MP12 of an opening as the representative position of the exposed surface of inner electrode layer 30 exposed at the third position more proximate to second main surface TS2 than first main surface TS1, and a center position MP13 of an opening as the representative position of the exposed surface of inner electrode layer 30 exposed at the fourth position more proximate to second main surface TS2 than first main surface TS1.

Supposing that "β3" is an angle between protruding end surface LS110 and a line of extension LN22 from a straight line that connects the following exposed surfaces of inner electrode layers 30 to each other, an exposed surface of inner electrode layer 30 exposed at the third position more proximate to first main surface TS1 than second main surface TS2, and an exposed surface of inner electrode layer 30 exposed at a fourth position more proximate to first main surface TS1 than second main surface TS2, the relationship of β1>β2>β3 may preferably be satisfied. More specifically, in second coupling surface LS122, the straight line that defines line of extension LN22 connects the following positions: center position MP22 of an opening as the representative position of the exposed surface of inner electrode layer 30 exposed at the third position more proximate to first main surface TS1 than second main surface TS2, and a center position MP23 of an opening as the representative position of the exposed surface of inner electrode layer 30 exposed at the fourth position more proximate to first main surface TS1 than second main surface TS2.

Angles "α3" and "β3" may preferably be smaller than angles "α2" and "β2", specifically, for example, greater than or equal to about 3° and less than or equal to about 40°. Angles "α3" and "β3" may more preferably be, for example, greater than or equal to about 3° and less than or equal to about 30°.

Non-limiting examples of methods for measurement of parameters according to the present preferred embodiment are hereinafter described. The parameters are obtainable from average values calculated from results of measurement of: cross section of the multilayer ceramic capacitor polished to the position of about ¼ of dimension "W", cross section of the multilayer ceramic capacitor polished to the position of about ½ of dimension "W", and cross section of the multilayer ceramic capacitor polished to the position at about ¾ of dimension "W".

The polishing of the multilayer ceramic capacitor starts on the lateral sides, from first lateral surface WS1 or second lateral surface WS2, and proceeds cross-sectionally until the position of about ¼ of dimension "W" is reached, until a particular surface in the LT cross section is exposed. Then, the LT cross section of multilayer body 10 thus polished and exposed is observed with SEM. The following dimensions and angles are measured in the obtained SEM images:

[1] Amount of protrusion L1 of protruding end surface LS110 (see FIG. 5),

[2] Thickness L2 in the direction of length of base electrode layer (see FIG. 2),

[3] Length T1 in direction of layer lamination "T" of first coupling surface LS121, second coupling surface LS122 (see FIG. 5),

[4] Length T2 in direction of layer lamination "T" of inner layer end surface LS100 (FIG. 5),

[5] Angle θ between first coupling surface LS121 and first outer layer end surface LS131 at boundary P11 (see FIGS. 5 and 6),

[6] Angle θ between second coupling surface LS122 and second outer layer end surface LS132 at boundary P21 (see FIGS. 5 and 7),

[7] Angle Φ between protruding end surface LS110 and a first virtual surface resulting from extension of first coupling surface LS121 toward protruding end surface LS110 (see FIGS. 5 and 6),

[8] Angle between first outer layer end surface LS131 and virtual surface VS1A resulting from extension of protruding end surface LS110 toward first main surface TS1,

[9] Angle Φ between protruding end surface LS110 and a second virtual surface resulting from extension of second coupling surface LS122 toward protruding end surface LS110 (see FIGS. 5 and 7),

[10] Angle between second outer layer end surface LS132 and virtual surface VS1B resulting from extension of protruding end surface LS110 toward second main surface TS2, and

[11] Angles α1, α2, α3, β1, β2, β3 between protruding end surface LS110 and lines of extension LN10, LN11, LN12, LN20, LN21 and LN22 from straight lines that connect exposed surfaces of a plurality of inner electrode layers (see FIGS. 6 and 7).

Prior to the measurement of the angles in [11], straight lines that connect the exposed surfaces of a plurality of inner electrode layers are defined as described below.

(1) In the LT cross section, the end surface contour of the multilayer body is defined by fitting the surfaces of the dielectric layers on the end surface of the multilayer body.

(2) To define the straight lines described above, the center position of an opening defined by adjacent ones of the dielectric layers on the end surface contour of the multilayer body is taken as the representative position of the exposed surface of inner electrode layer.

After the measurement, the multilayer body is polished cross-sectionally to the position of about ½ of dimension "W" is reached, and an SEM image is similarly obtained and measured again. Then, the multilayer body is further polished cross-sectionally to the position of about ¾ of dimension "W" is reached to obtain and measure of an SEM image again. The dimensions and angles described above are measured in three SEM images thus obtained from these cross sections at the positions of about ¼, about ½ and about ¾ of dimension "W" of the multilayer ceramic capacitor. Then, the obtained dimensions and angles are averaged. The present preferred embodiment uses the average values thus calculated from the measured dimensions and angles.

Next, a non-limiting example of a production method for multilayer ceramic capacitor 1 according to the present preferred embodiment is hereinafter described.

First, dielectric sheets for dielectric layers 20 and an electrically conductive paste for inner electrode layers 30 are prepared. The dielectric sheets and the electrically conductive paste for inner electrode layers include a binder(s) and a solvent(s). The binder(s) and the solvent(s) may be selected from known materials.

The electrically conductive paste for inner electrode layer 30 is printed on the dielectric sheets in a predetermined pattern by, for example, screen printing or gravure printing. Thus, the following dielectric sheets are prepared: dielectric sheets with the pattern of first inner electrode layers 31 printed thereon and dielectric sheets with the pattern of second inner electrode layers 32 printed thereon.

A predetermined number of dielectric sheets with no inner electrode pattern printed thereon are laminated on one another to form a portion that defines outer layer portion 12A on the side of first main surface TS1. The dielectric sheets with the pattern of first inner electrode layers 31 printed thereon and dielectric sheets with the pattern of second inner electrode layers 32 printed thereon are alternately laminated on each other to form a portion that defines inner layer portion 11. A predetermined number of dielectric sheets with no inner electrode pattern printed thereon are laminated on the portion that defines inner layer portion 11 to form outer layer portion 12B located on the side of second main surface TS2. Thus, a multilayer sheet is obtained.

In the present preferred embodiment, dielectric sheets with a greater volume ratio of organic matter than dielectric sheets for inner layer portion 11 may be used to form the portions that define the outer layer portion (outer layer portion 12A on first main surface side, outer layer portion 12B on second main surface).

Next, the produced multilayer sheet is pressed in the direction of layer lamination by, for example, isostatic pressing to produce a multilayer block.

Then, the multilayer block is cut in a predetermined size into multilayer chips. The corner portions and ridge portions of the multilayer chips thus obtained may be rounded by, for example, barrel finishing.

Next, the multilayer chips are baked to produce multilayer body 10. The baking temperature used, although it depends on materials of dielectric layers 20 and inner electrode layers 30, may preferably be, for example, higher than or equal to about 900° C. and lower than or equal to about 1400° C.

The dielectric sheets used to form the portion that define the outer layer portion, because of a greater volume ratio of organic matter as described above, are contractible to a greater extent than the dielectric sheets used to form inner layer portion 11. This may cause inner layer portion 11 to protrude farther than the outer layer portion.

Then, the baked multilayer body 10 is polished by barrel finishing. The corners and step portions of the multilayer body are selectively polished. As a result of the process described thus far, multilayer body 10 structured as described in the present preferred embodiment is obtained. Multilayer body 10 according to the present preferred embodiment may be produced by other methods. For instance, multilayer body 10 according to the present preferred embodiment may be obtained by selectively performed laser polishing.

An electrically conductive paste is applied to both of the end surfaces of multilayer body 10, which will define the base electrode layer (first base electrode layer 50A, second base electrode layer 50B). In the present preferred embodiment, the base electrode layer is a baked layer. The electrically conductive paste including a glass component and a metal(s) is applied to multilayer body 10 by, for example, dipping. Then, the applied paste is baked to form the base electrode layer. The baking temperature employed then may preferably be, for example, higher than or equal to about 700° C. and lower than or equal to about 900° C.

In case a multilayer chip yet to be baked and the electrically conductive paste applied to the multilayer chip are baked all together, a material including a ceramic component instead of the glass component may be used to obtain the baked layer. The ceramic material added may preferably be the same ceramic material as used in dielectric layer 20. In this instance, the electrically conductive paste is applied to the multilayer chip before baking, and the multilayer chip and the electrically conductive paste are baked all together to produce multilayer body 10 including a baked layer formed thereon.

Then, a plating layer is formed on the surface of the base electrode layer. In the present preferred embodiment, a first plating layer 60A is formed on the surface of first base electrode layer 50A. A second plating layer 60B is formed on the surface of second base electrode layer 50B. In the present preferred embodiment, the plating layers thus formed are, for example, an Ni-plated layer and an Sn-plated layer. The plating treatment may be either electrolytic plating or electroless plating. The electroless plating may involve a more complex process, because a catalyst pretreatment, for example, may be required to improve the rate of deposition. Therefore, electrolytic plating may be typically used. The Ni-plated layer and the Sn-plated layer may be sequentially formed by, for example, barrel plating.

In case a thin film layer is formed as the base electrode layer, the thin film layer may be formed as the base electrode layer by masking any target area where the external electrode is preferably formed. The thin film layer may be formed by, for example, sputtering or vapor deposition. The thin film layer may be, for example, less than or equal to about 1 μm in thickness in which metallic particles are deposited.

In case an electrically conductive resin layer is formed as the base electrode layer, the electrically conductive resin layer may be formed so as to cover the baked layer or may be directly disposed on multilayer body 10 in the absence of the baked layer. In case the electrically conductive resin layer is formed, an electrically conductive resin paste including a thermosetting resin(s) and a metal component is applied to the baked layer or multilayer body 10 and then thermally treated at a temperature, for example, between about 250° C. and about 550° C. This treatment thermally cures the thermosetting resin(s), forming an electrically conductive resin layer. The thermal treatment then may preferably be performed in, for example, an $N_2$ atmosphere. Further, the concentration of oxygen then may preferably be maintained at about 100 ppm or less to prevent the thermosetting resin from splashing around and also avoid oxidation of metallic components.

The plating layer, in the absence of the base electrode layer, may be directly formed on the exposed portions of inner electrode layers 30 of multilayer body 10. In this instance, first end surface LS1 and second end surface LS2 of multilayer body 10 are subjected to a plating treatment to form a plating layer on the exposed portions of inner electrode layers 30. The plating treatment may be either electrolytic plating or electroless plating. The electroless plating may involve a more complex process, because a catalyst pretreatment, for example, may be required to improve the rate of deposition. Therefore, electrolytic plating may be typically used. A preferable example of the plating technique may be barrel plating. An upper plating layer may be formed on a lower plating layer, if necessary, by the same or similar technique.

Thus, multilayer ceramic capacitor 1 is produced.

Figure 8:
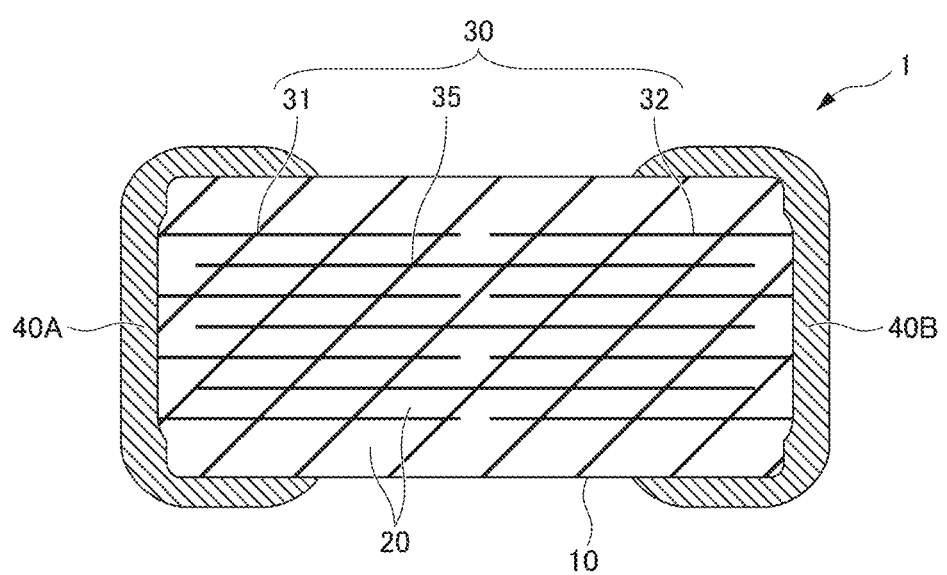
FIG. 8 is a schematic view of an exemplified double-row structure of the multilayer ceramic capacitor.
Figure 9:
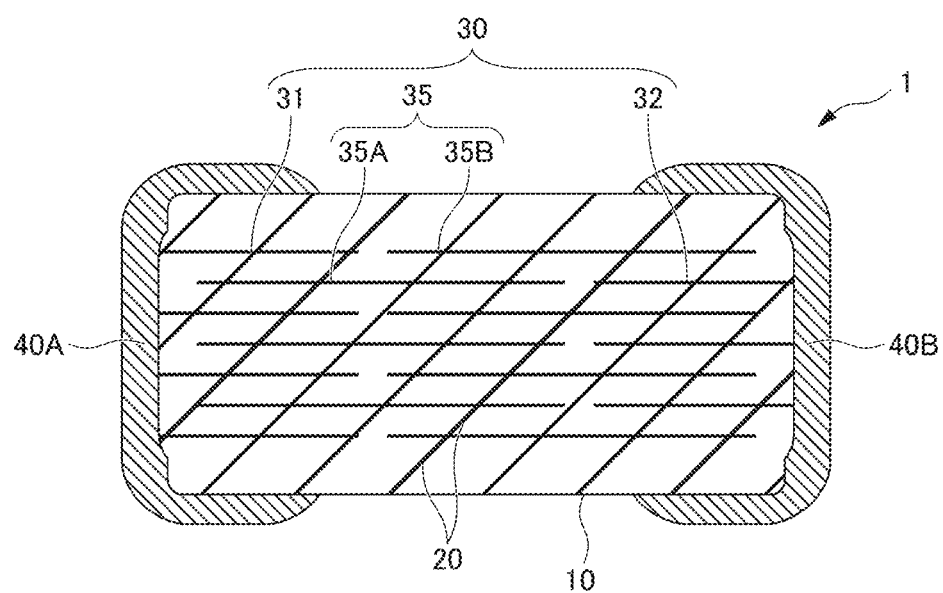
FIG. 9 is a schematic view of an exemplified triple-row structure of the multilayer ceramic capacitor.
Figure 10:
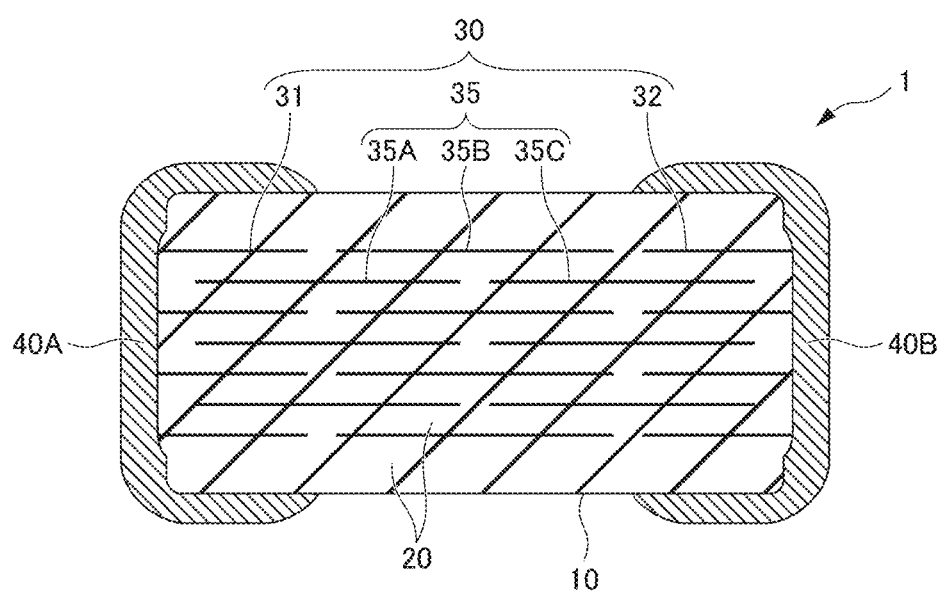
FIG. 10 is a schematic view of an exemplified quadruple-row structure of the multilayer ceramic capacitor.

The structural features of multilayer ceramic capacitor 1 are not necessarily limited to what is illustrated in FIG. 2. For example, multilayer ceramic capacitor 1 may have a structure in which the opposed electrode portions are divided in two, three, or four rows, as illustrated in FIG. 8, 9 or 10. FIG. 8 is a schematic view of an exemplified double-row structure of the multilayer ceramic capacitor. FIG. 9 is a schematic view of an exemplified triple-row structure of the multilayer ceramic capacitor. FIG. 10 is a schematic view of an exemplified quadruple-row structure of the multilayer ceramic capacitor.

Multilayer ceramic capacitor 1 illustrated in FIG. 8 has a double-row structure, in which inner electrode layers 30 include, in addition to first inner electrode layers 31 and second inner electrode layers 32, floating inner electrode layers 35 which are not extracted to first end surface LS1 or second end surface LS2. Multilayer ceramic capacitor 1 illustrated in FIG. 9 has a triple-row structure including, as floating inner electrode layers 35, first floating inner electrode layers 35A and second floating inner electrode layers 35B. Multilayer ceramic capacitor 1 illustrated in FIG. 10 has a quadruple-row structure including, as floating inner electrode layers 35, first floating inner electrode layers 35A, second floating inner electrode layers 35B, and third floating inner electrode layers 35C. Multilayer ceramic capacitor 1 thus including floating inner electrode layers 35 as inner electrode layers 30 has a structure in which the opposed electrode portions are divided in a plurality of rows. This forms a plurality of capacitor components between inner electrode layers 30 that are opposed to each other, in which the capacitor elements are connected in series. This may allow voltage reduction for each capacitor element, leading to higher pressure tolerance of multilayer ceramic capacitor 1. Multilayer ceramic capacitor 1 according to the present preferred embodiment may have a multiple-row structure in which the opposed electrode portions are divided in more than four rows.

Multilayer ceramic capacitor 1 may be a two-terminal capacitor including two external electrodes or may be a multi-terminal including a larger number of external electrodes.

The above-described preferred embodiment describes an example of the multilayer ceramic electronic component, which is a multilayer ceramic capacitor including, as ceramic layers, dielectric layers 20 obtained from dielectric ceramics. The multilayer ceramic electronic component disclosed herein, however, is not necessarily limited to this example. The multilayer ceramic electronic component disclosed herein may include, in its applicable range of products, various multilayer ceramic electronic components, for example, piezoelectric components including ceramic layers using piezoelectric ceramics, thermistors including ceramic layers using semiconductor ceramics, and inductors including ceramic layers using magnetic ceramics. Examples of the piezoelectric ceramics may include, for example, PZT (lead titanium zirconium oxide)-based ceramics. Example of the semiconductor ceramics may include, for example, spinel-based ceramics, and examples of the magnetic ceramics may include, for example, ferrite-based ceramics.

This disclosure is not necessarily limited to the preferred embodiments described above and may be variously modified without departing the scope of technical ideas and purposes of this disclosure. The scope of this disclosure may include the combination of two or more of the structural and/or technical features described in the preferred embodiments above.

Multilayer ceramic capacitor 1 according to the preferred embodiments described thus far may provide the following advantageous effects.

(1) Multilayer ceramic capacitor 1 (multilayer ceramic electronic component 1) according to the present preferred embodiment includes multilayer body 10 including a plurality of dielectric layers 20 (ceramic layers 20) laminated on each other, a plurality of inner electrode layers 30 (inner conductor layers 30) laminated on dielectric layers 20, first main surface TS1 and second main surface TS2 opposed to each other in direction of layer lamination "T", first lateral surface WS1 and second lateral surface WS2 opposed to each other in direction of width "W" orthogonal or substantially orthogonal to direction of layer lamination "T", and first end surface LS1 and second end surface LS2 opposed to each other in direction of length "L" orthogonal or substantially orthogonal to direction of layer lamination "T" and direction of width "W", first external electrode 40A disposed on first end surface LS1 and connected to inner electrode layers 30, and second external electrode 40B disposed on second end surface LS2 and connected to inner electrode layers 30. Multilayer body 10 includes inner layer portion 11 including a portion of dielectric layers 20 and inner electrode layers 30, and outer layer portion 12A on the side of first main surface TS1 (first outer layer portion) and outer layer portion 12B on the side of second main surface TS2 (second outer layer portion) with inner layer portion 11 interposed therebetween, outer layer portion 12A and outer layer portion 12B respectively including any portion of dielectric layers 20 except for the portion included in inner layer portion 11. First end surface LS1 and second end surface LS2 each include inner layer end surface LS100 including a surface defined by inner layer portion 11, first outer layer end surface LS131 including a surface defined by outer layer portion 12A on first main surface side, and second outer layer end surface LS132 including a surface defined by outer layer portion 12B on second main surface side. Inner layer end surface LS100 includes protruding end surface LS110 including a surface that protrudes farther in direction of length "L" than first outer layer end surface LS131 and second outer layer end surface LS132, first coupling surface LS121 defined by a surface that connects first outer layer end surface LS131 and protruding end surface LS110 to each other, and second coupling surface LS122 defined by a surface that connects second outer layer end surface LS132 and protruding end surface LS110 to each other. Angle θ between first outer layer end surface LS131 and first coupling surface LS121 at boundary P11 between first outer layer end surface LS131 and first coupling surface LS121 is an obtuse angle. Angle θ between second outer layer end surface LS132 and second coupling surface LS122 at boundary P21 between second outer layer end surface LS132 and second coupling surface LS122 is an obtuse angle. Inner electrode layers 30 are exposed on first coupling surface LS121 and second coupling surface LS122.

The structure described in Japanese Patent Laid-Open No. 2007-142118 includes a step portion at the right angle between the inner layer portion and the outer layer portion. Thus, air bubbles may be more likely to form in the external electrode disposed in the step portion. The air bubbles, if generated, may degrade the moisture resistance of the multilayer ceramic capacitor. In case a baked layer is provided as the base electrode layer of the external electrode, for example, the air bubbles may be likely to remain in the step portion when an electrically conductive paste is applied to form the baked layer. Such air bubbles may result in the following risks: the baking treatment may cause expansion of the volume of air, or large voids or pin holes may be formed in the baked layer when air leaks out. These unfavorable events may involve the risk of degrading the multilayer ceramic capacitor in moisture resistance.

According to the present preferred embodiment, first coupling surface LS121 connecting first outer layer end surface LS131 with protruding end surface LS110 of inner layer end surface LS100 is disposed on the side of inner layer end surface LS100 closer to first main surface TS1. Thus, air bubbles of the electrically conductive paste may be unlikely to form at the boundary between inner layer portion 11 and the outer layer portion. According to the present preferred embodiment, second coupling surface LS122 connecting second outer layer end surface LS132 with protruding end surface LS110 of inner layer end surface LS100 is disposed on the side of inner layer end surface LS100 closer to second main surface TS2. Thus, air bubbles of the electrically conductive paste may be unlikely to form at the boundary between inner layer portion 11 and the outer layer portion. This may considerably reduce the likelihood of pin holes being formed at the boundary between inner layer portion 11 and the outer layer portion, leading to an improved moisture resistance of multilayer ceramic capacitor 1.

The preferred embodiments of the present invention may achieve an improved advantageous effect when a baked layer is provided, as the base electrode layer, by applying the electrically conductive paste to the multilayer body. External electrode 40, however, may be structured in a different manner. For instance, the base electrode layer of the external electrode may be an electrically conductive resin layer. The electrically conductive resin layer may have a certain degree of viscosity before curing. In case the step portion at the boundary between inner layer portion 11 and the outer layer portion is formed at the right angle, air bubbles may be likely to penetrate into the step portion when an uncured electrically conductive resin is applied to the multilayer body. On the other hand, the preferred embodiments, in which first coupling surface LS121 and second coupling surface LS122 are provided, may effectively avoid the risk of air bubbles being generated in external electrode 40 disposed at the boundary between inner layer portion 11 and the outer layer portion, regardless of whether the base electrode layer is an electrically conductive resin layer. As a result, multilayer ceramic capacitor 1 may improve in moisture resistance.

The plating layer may be directly provided on multilayer body 10 in the absence of the base electrode layer. Yet, the preferred embodiments may still reduce the risk of air bubbles being generated in external electrode 40 disposed at the boundary between inner layer portion 11 and the outer layer portion, enabling multilayer ceramic capacitor 1 to have improved moisture resistance.

According to the present preferred embodiment, end surface LS includes first outer layer end surface LS131 and second outer layer end surface LS132. First outer layer end surface LS131 and second outer layer end surface LS132 may each preferably include a flat or substantially flat surface. First outer layer end surface LS131 and second outer layer end surface LS132 provided by the present preferred embodiment may effectively prevent excessive fluidity of the used electrically conductive paste. Thus, the electrically conductive paste may be unlikely to reduce in thickness near the end surface of inner layer portion 11, enabling multilayer ceramic capacitor 1 to improve in moisture resistance.

In the absence of first outer layer end surface LS131 and second outer layer end surface LS132 described in the present preferred embodiment, external electrode 40 may be likely to become thinner in the R-chamfered portion of a ridge portion between end surface LS and first main surface TS1 or second main surface TS2 of multilayer body 10 in case inner electrode layers 30 are exposed at the R-chamfered portion. This may lead to a shorter distance between inner electrode layers 30 exposed at the R-chamfered portion and the surface of external electrode 40, possibly degrading the moisture resistance of multilayer ceramic capacitor 1.

In the present preferred embodiment, inner layer end surface LS100 includes protruding end surface LS110. Protruding end surface LS110 may preferably include a flat or substantially flat surface. If end surface LS of multilayer body 10 includes a bulging curved shape in the vicinity of its center, the electrically conductive paste, if applied by, for example, dipping, may often accumulate near the end surface of multilayer body 10 due to gravity. In this instance, the external electrode near the center of end surface LS of multilayer body 10 may become too thick. The electrically conductive paste near the end surface of inner layer portion 11, on the other hand, may often have a reduced thickness, which may result in the risk of poor moisture resistance of multilayer ceramic capacitor 1.

Protruding end surface LS110 described in the present preferred embodiment may effectively prevent the electrically conductive paste, even if applied by dipping, from accumulating near the center of protruding end surface LS110. Thus, external electrode 40 near the center of protruding end surface LS110 may be prevented from becoming too thick, and multilayer ceramic capacitor 1 may be dimensionally reduced in the direction of length. This reduction of the thickest portion of external electrode 40 may allow a volume increase of opposed electrode portion 11E of multilayer body 10 (capacitor effective portion), which is expected to achieve a greater electrostatic capacitance. Thus, the degree of freedom may be favorably improved in designing multilayer ceramic capacitor 1. The electrically conductive paste may be thus unlikely to accumulate near the center of protruding end surface LS110, which may reduce or avoid the risk of thickness variability of the electrically conductive paste that covers inner layer portion 11. Thus, the electrically conductive paste may be less likely to become thinner near the end surface of inner layer portion 11, which may afford an improved moisture resistance of multilayer ceramic capacitor 1. As described thus far, the present preferred embodiment may successfully provide multilayer ceramic capacitor 1 that excels in moisture resistance.

(2) In the present preferred embodiment, first coupling surface LS121 and second coupling surface LS122 are each defined by a curved surface or an inclined plane. First coupling surface LS121 and second coupling surface LS122 with an inclination or curve may increase the area of exposure of inner electrode layers 30, enabling more stable contact between the inner electrode layers and the external electrode. Multilayer ceramic capacitor 1 may accordingly have improved reliability. Further advantageously, air bubbles may be less likely to form and remain when the electrically conductive paste is used, achieving better moisture resistance of multilayer ceramic capacitor 1.

(3) In the present preferred embodiment, protruding end surface LS110 is a flat or substantially flat surface, and first outer layer end surface LS131 and second outer layer end surface LS132 each include a flat or substantially flat surface, the angle between protruding end surface LS110 and the first virtual surface resulting from extension of first coupling surface LS121 toward protruding end surface LS110 is greater than the angle between protruding end surface LS110 and first outer layer end surface LS131, and the angle between protruding end surface LS110 and the second virtual surface resulting from extension of second coupling surface LS122 toward protruding end surface LS110 is greater than the angle between protruding end surface LS110 and second outer layer end surface LS132. These structural features may successfully prevent the electrically conductive paste from accumulating near the center of protruding end surface LS110 and forming and leaving air bubbles, thus achieving a better product quality of multilayer ceramic capacitor 1.

(4) In the present preferred embodiment, protruding end surface LS110 and first outer layer end surface LS131 are parallel or substantially parallel to each other, and protruding end surface LS110 and second outer layer end surface LS132 are also parallel or substantially parallel to each other. This may reduce the risk of thickness variability resulting from gravity of the electrically conductive paste applied to end surface LS, thus ensuring an improved product quality.

(5) In the present preferred embodiment, the amount of protrusion of protruding end surface LS110 relative to first outer layer end surface LS131 is greater than or equal to about 5 µm and less than or equal to about 50 µm, and the amount of protrusion of protruding end surface LS110 relative to second outer layer end surface LS132 is greater than or equal to about 5 µm and less than or equal to about 50 µm. Thus, air bubbles may be unlikely to form when the electrically conductive paste is used in multilayer ceramic capacitor 1 which is further miniaturized.

(6) In the present preferred embodiment, the following angles are defined. Supposing that, in first coupling surface LS121, "$\alpha1$" is an angle between protruding end surface LS110 and line of extension LN10 from a straight line that connects an exposed surface of one of inner electrode layers 30 exposed at the position most proximate to first main surface TS1 to an exposed surface of one of inner electrode layers 30 exposed at the second position more proximate to second main surface TS2 than first main surface TS1, angle "$\alpha1$" may preferably be greater than or equal to about 20° and less than or equal to about 60°. Supposing that, in second coupling surface LS122, "$\beta1$" is an angle between protruding end surface LS110 and line of extension LN20 from a straight line that connects an exposed surface of one of inner electrode layers 30 exposed at the position most proximate to second main surface TS2 to an exposed surface of one of inner electrode layers 30 exposed at the second position more proximate to first main surface TS1 than second main surface TS2, angle "$\beta1$" may preferably be greater than or equal to about 20° and less than or equal to about 60°. These structural features may successfully prevent the electrically conductive paste from accumulating near the center of protruding end surface LS110 and forming and leaving air bubbles, thus achieving a better product quality of multilayer ceramic capacitor 1.

(7) First coupling surface LS121 and second coupling surface LS122 are each defined by a curved surface.

Supposing that, in first coupling surface LS121, "$\alpha1$" is an angle between protruding end surface LS110 and line of extension LN10 from a straight line that connects an exposed surface of one of inner electrode layers 30 exposed at the position most proximate to first main surface TS1 to an exposed surface of one of inner electrode layers 30 exposed at the second position more proximate to second main surface TS2 than first main surface TS1 and that "$\alpha2$" is an angle between protruding end surface LS110 and line of extension LN11 from a straight line that connects an exposed surface of one of inner electrode layers 30 exposed at the second position more proximate to second main surface TS2 than first main surface TS1 to an exposed surface of one of inner electrode layers 30 exposed at the third position more proximate to second main surface TS2 than first main surface TS1, the relationship of $\alpha1 > \alpha2$ may be satisfied.

Supposing that, in second coupling surface LS122, "$\beta1$" is an angle between protruding end surface LS110 and line of extension LN20 from a straight line that connects an exposed surface of one of inner electrode layers 30 exposed at the position most proximate to second main surface TS2 to an exposed surface of one of inner electrode layers 30 exposed at the second position more proximate to first main surface TS1 than second main surface TS2 and that "$\beta2$" is an angle between protruding end surface LS110 and line of extension LN21 from a straight line that connects an exposed surface of one of inner electrode layers 30 exposed at the second position more proximate to first main surface TS1 than second main surface TS2 to an exposed surface of one of inner electrode layers 30 exposed at the third position more proximate to first main surface TS1 than second main surface TS2, the relationship of $\beta1 > \beta2$ may be satisfied.

These structural features may successfully prevent the electrically conductive paste from accumulating near the center of protruding end surface LS110 and forming and leaving air bubbles, thus achieving a better product quality of multilayer ceramic capacitor 1.

(8) In the present preferred embodiment, supposing that "α3" is an angle between protruding end surface LS110 and line of extension LN12 from a straight line that connects an exposed surface of one of inner electrode layers 30 exposed at the third position more proximate to second main surface TS2 than first main surface TS1 to an exposed surface of one of inner electrode layers 30 exposed at the fourth position more proximate to second main surface TS2 than first main surface TS1, the relationship of α1>α2>α3 may be satisfied.

Supposing that "β3" is an angle between protruding end surface LS110 and line of extension LN22 from a straight line that connects an exposed surface of one of inner electrode layers 30 exposed at the third position more proximate to first main surface TS1 than second main surface TS2 to an exposed surface of one of inner electrode layers 30 exposed at the fourth position more proximate to first main surface TS1 than second main surface TS2, the relationship of β1>β2>β3 may be satisfied. These structural features may successfully prevent the electrically conductive paste from accumulating near the center of protruding end surface LS110 and forming and leaving air bubbles, thus achieving a better product quality of multilayer ceramic capacitor 1.

The present invention is not necessarily limited to the above-described preferred embodiment and may be variously modified without departing the scope of technical ideas and purposes of the present invention. The scope of the present invention may include a combination of two or more of the structural and/or technical features described in preferred embodiments of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
    a multilayer body including a plurality of ceramic layers laminated on each other, a plurality of inner conductor layers laminated on the plurality of ceramic layers, a first main surface and a second main surface opposed to each other in a direction of layer lamination, a first lateral surface and a second lateral surface opposed to each other in a direction of width orthogonal or substantially orthogonal to the direction of layer lamination, and a first end surface and a second end surface opposed to each other in a direction of length orthogonal or substantially orthogonal to the direction of layer lamination and the direction of width;
    a first external electrode on the first end surface and connected to the plurality of inner conductor layers; and
    a second external electrode on the second end surface and connected to the plurality of inner conductor layers; wherein
    the multilayer body includes an inner layer portion including a portion of the plurality of ceramic layers and the plurality of inner conductor layers, and a first outer layer portion on a side of the first main surface and a second outer layer portion on a side of the second main surface with the inner layer portion interposed therebetween, the first outer layer portion and the second outer layer portion respectively including a portion of the plurality of ceramic layers excluding the portion included in the inner layer portion;
    the first end surface and the second end surface each include an inner layer end surface including a surface defined by the inner layer portion, a first outer layer end surface including a surface defined by the first outer layer portion, and a second outer layer end surface including a surface defined by the second outer layer portion;
    the inner layer end surface includes a protruding end surface including a surface protruding further in the direction of length than the first outer layer end surface and the second outer layer end surface, a first coupling surface connecting the first outer layer end surface and the protruding end surface to each other, and a second coupling surface connecting the second outer layer end surface and the protruding end surface to each other;
    an angle between the first outer layer end surface and the first coupling surface at a boundary between the first outer layer end surface and the first coupling surface is an obtuse angle;
    an angle between the second outer layer end surface and the second coupling surface at a boundary between the second outer layer end surface and the second coupling surface is an obtuse angle;
    the plurality of inner conductor layers are exposed at the first coupling surface and the second coupling surface;
    the protruding end surface is a flat or substantially flat surface, and the first outer layer end surface and the second outer layer end surface each include a flat or substantially flat surface;
    an angle between the protruding end surface and a first virtual surface resulting from extension of the first coupling surface toward the protruding end surface is greater than an angle between the protruding end surface and the first outer layer end surface; and
    an angle between the protruding end surface and a second virtual surface resulting from extension of the second coupling surface toward the protruding end surface is greater than an angle between the protruding end surface and the second outer layer end surface.

2. The multilayer ceramic electronic component according to claim 1, wherein
    the protruding end surface and the first outer layer end surface are parallel or substantially parallel to each other; and
    the protruding end surface and the second outer layer end surface are parallel or substantially parallel to each other.

3. The multilayer ceramic electronic component according to claim 1, wherein each of the plurality of ceramic layers includes at least one of $BaTiO_3$, $CaTiO_3$, $SrTiO_3$ or $CaZrO_3$.

4. The multilayer ceramic electronic component according to claim 3, wherein each of the plurality of ceramic layers further includes at least one of a Mn compound, an Fe compound, a Cr compound, a Co compound, or an Ni compound as an accessory component.

5. The multilayer ceramic electronic component according to claim 1, wherein a thickness of each of the plurality of ceramic layers is greater than or equal to about 0.2 μm and less than or equal to about 10 μm.

6. The multilayer ceramic electronic component according to claim 1, wherein a number of the plurality of ceramic layers is greater than or equal to 15 layers and less than or equal to 1200 layers.

7. The multilayer ceramic electronic component according to claim 1, wherein the plurality of inner electrode layers includes first inner electrode layers connected to the first external electrode and second inner electrode layers connected to the second external electrode.

8. The multilayer ceramic electronic component according to claim 1, wherein each of the plurality of inner electrode layers includes at least one of Ni, Cu, Ag, Pd, or Au, or an alloy including at least one of Ni, Cu, Ag, Pd, or Au.

9. The multilayer ceramic electronic component according to claim 1, wherein a thickness of each of the plurality of inner electrode layers is greater than or equal to about 0.2 μm and less than or equal to about 2.0 μm.

10. The multilayer ceramic electronic component according to claim 1, wherein each of the first and second external electrodes includes a base electrode layer and a plating layer on the base electrode layer.

11. The multilayer ceramic electronic component according to claim 10, wherein each of the base electrode layers of the first and second external electrodes includes a baked layer.

12. The multilayer ceramic electronic component according to claim 11, wherein each of the baked layers of the first and second external electrodes includes a metallic component and at least one of a glass component and a ceramic component.

13. The multilayer ceramic electronic component according to claim 12, wherein the metallic component includes at least one of Cu, Ni, Ag, Pd, Ag—Pd alloys, or Au.

14. The multilayer ceramic electronic component according to claim 12, wherein the glass component includes at least one of B, Si, Ba, Mg, Al, or Li.

15. A multilayer ceramic electronic component-comprising:
a multilayer body including a plurality of ceramic layers laminated on each other, a plurality of inner conductor layers laminated on the plurality of ceramic layers, a first main surface and a second main surface opposed to each other in a direction of layer lamination, a first lateral surface and a second lateral surface opposed to each other in a direction of width orthogonal or substantially orthogonal to the direction of layer lamination, and a first end surface and a second end surface opposed to each other in a direction of length orthogonal or substantially orthogonal to the direction of layer lamination and the direction of width;
a first external electrode on the first end surface and connected to the plurality of inner conductor layers; and
a second external electrode on the second end surface and connected to the plurality of inner conductor layers; wherein
the multilayer body includes an inner layer portion including a portion of the plurality of ceramic layers and the plurality of inner conductor layers, and a first outer layer portion on a side of the first main surface and a second outer layer portion on a side of the second main surface with the inner layer portion interposed therebetween, the first outer layer portion and the second outer layer portion respectively including a portion of the plurality of ceramic layers excluding the portion included in the inner layer portion;
the first end surface and the second end surface each include an inner layer end surface including a surface defined by the inner layer portion, a first outer layer end surface including a surface defined by the first outer layer portion, and a second outer layer end surface including a surface defined by the second outer layer portion;
the inner layer end surface includes a protruding end surface including a surface protruding further in the direction of length than the first outer layer end surface and the second outer layer end surface, a first coupling surface connecting the first outer layer end surface and the protruding end surface to each other, and a second coupling surface connecting the second outer layer end surface and the protruding end surface to each other;
an angle between the first outer layer end surface and the first coupling surface at a boundary between the first outer layer end surface and the first coupling surface is an obtuse angle;
an angle between the second outer layer end surface and the second coupling surface at a boundary between the second outer layer end surface and the second coupling surface is an obtuse angle;
the plurality of inner conductor layers are exposed at the first coupling surface and the second coupling surface;
an amount of protrusion of the protruding end surface relative to the first outer layer end surface is greater than or equal to about 5 μm and less than or equal to about 50 μm; and
an amount of protrusion of the protruding end surface relative to the second outer layer end surface is greater than or equal to about 5 μm and less than or equal to about 50 μm.

16. The multilayer ceramic electronic component according to claim 15, wherein
the first coupling surface and the second coupling surface are each defined by a curved surface;
in the first coupling surface, "α1" is an angle between the protruding end surface and a line of extension from a straight line that connects an exposed surface of one of the inner conductor layers exposed at the position most proximate to the first main surface to an exposed surface of one of the inner conductor layers exposed at the second position more proximate to the second main surface than the first main surface, "α2" is an angle between the protruding end surface and a line of extension from a straight line that connects an exposed surface of one of the inner conductor layers exposed at the second position more proximate to the second main surface than the first main surface to an exposed surface of one of the inner conductor layers exposed at a third position more proximate to the second main surface than the first main surface, and a relationship of α1>α2 is satisfied; and
in the second coupling surface, "β1" is an angle between the protruding end surface and a line of extension from a straight line that connects an exposed surface of one of the inner conductor layers exposed at the position most proximate to the second main surface to an exposed surface of one of the inner conductor layers exposed at the second position more proximate to the first main surface than the second main surface, "β2" is an angle between the protruding end surface and a line of extension from a straight line that connects an exposed surface of one of the inner conductor layers exposed at the second position more proximate to the first main surface than the second main surface to an exposed surface of one of the inner conductor layers exposed at a third position more proximate to the first main surface than the second main surface, and a relationship of β1>β2 is satisfied.

17. The multilayer ceramic electronic component according to claim 16, wherein
"α3" is an angle between the protruding end surface and a line of extension from a straight line that connects an exposed surface of one of the inner conductor layers exposed at the third position more proximate to the second main surface than the first main surface to an exposed surface of one of the inner conductor layers exposed at a fourth position more proximate to the second main surface than the first main surface, and a relationship of α1>α2>α3 is satisfied; and
"β3" is an angle between the protruding end surface and a line of extension from a straight line that connects an exposed surface of one of the inner conductor layers exposed at the third position more proximate to the first main surface than the second main surface to an exposed surface of one of the inner conductor layers exposed at a fourth position more proximate to the first main surface than the second main surface, and a relationship of β1>β2>β3 is satisfied.

18. A multilayer ceramic electronic component-comprising:
a multilayer body including a plurality of ceramic layers laminated on each other, a plurality of inner conductor layers laminated on the plurality of ceramic layers, a first main surface and a second main surface opposed to each other in a direction of layer lamination, a first lateral surface and a second lateral surface opposed to each other in a direction of width orthogonal or substantially orthogonal to the direction of layer lamination, and a first end surface and a second end surface opposed to each other in a direction of length orthogonal or substantially orthogonal to the direction of layer lamination and the direction of width;
a first external electrode on the first end surface and connected to the plurality of inner conductor layers; and
a second external electrode on the second end surface and connected to the plurality of inner conductor layers; wherein
the multilayer body includes an inner layer portion including a portion of the plurality of ceramic layers and the plurality of inner conductor layers, and a first outer layer portion on a side of the first main surface and a second outer layer portion on a side of the second main surface with the inner layer portion interposed therebetween, the first outer layer portion and the second outer layer portion respectively including a portion of the plurality of ceramic layers excluding the portion included in the inner layer portion;
the first end surface and the second end surface each include an inner layer end surface including a surface defined by the inner layer portion, a first outer layer end surface including a surface defined by the first outer layer portion, and a second outer layer end surface including a surface defined by the second outer layer portion;
the inner layer end surface includes a protruding end surface including a surface protruding further in the direction of length than the first outer layer end surface and the second outer layer end surface, a first coupling surface connecting the first outer layer end surface and the protruding end surface to each other, and a second coupling surface connecting the second outer layer end surface and the protruding end surface to each other;
an angle between the first outer layer end surface and the first coupling surface at a boundary between the first outer layer end surface and the first coupling surface is an obtuse angle;
an angle between the second outer layer end surface and the second coupling surface at a boundary between the second outer layer end surface and the second coupling surface is an obtuse angle;
the plurality of inner conductor layers are exposed at the first coupling surface and the second coupling surface;
in the first coupling surface, "α1" is an angle between the protruding end surface and a line of extension from a straight line that connects an exposed surface of one of the inner conductor layers exposed at a position most proximate to the first main surface to an exposed surface of one of the inner conductor layers exposed at a second position more proximate to the second main surface than the first main surface, and the angle "α1" is greater than or equal to about 20° and less than or equal to about 60°; and
in the second coupling surface, "β1" is an angle between the protruding end surface and a line of extension from a straight line that connects an exposed surface of one of the inner conductor layers exposed at a position most proximate to the second main surface to an exposed surface of one of the inner conductor layers exposed at a second position more proximate to the first main surface than the second main surface, and the angle "β1" is greater than or equal to about 20° and less than or equal to about 60°.

19. The multilayer ceramic electronic component according to claim 18, wherein
the first coupling surface and the second coupling surface are each defined by a curved surface;
in the first coupling surface, "α2" is an angle between the protruding end surface and a line of extension from a straight line that connects an exposed surface of one of the inner conductor layers exposed at the second position more proximate to the second main surface than the first main surface to an exposed surface of one of the inner conductor layers exposed at a third position more proximate to the second main surface than the first main surface, and a relationship of α1>α2 is satisfied; and
in the second coupling surface, "β2" is an angle between the protruding end surface and a line of extension from a straight line that connects an exposed surface of one of the inner conductor layers exposed at the second position more proximate to the first main surface than the second main surface to an exposed surface of one of the inner conductor layers exposed at a third position more proximate to the first main surface than the second main surface, and a relationship of β1>β2 is satisfied.

20. The multilayer ceramic electronic component according to claim 19, wherein
"α3" is an angle between the protruding end surface and a line of extension from a straight line that connects an exposed surface of one of the inner conductor layers exposed at the third position more proximate to the second main surface than the first main surface to an exposed surface of one of the inner conductor layers exposed at a fourth position more proximate to the second main surface than the first main surface, and a relationship of α1>α2 >α3 is satisfied; and "β3" is an angle between the protruding end surface and a line of extension from a straight line that connects an exposed surface of one of the inner conductor layers exposed at the third position more proximate to the first main surface than the second main surface to an exposed surface of one of the inner conductor layers exposed at a fourth position more proximate to the first main surface than the second main surface, and a relationship of $β1>β2>β3$ is satisfied.

* * * * *